(12) United States Patent
Yakimenko et al.

(10) Patent No.: US 9,911,046 B1
(45) Date of Patent: Mar. 6, 2018

(54) METHOD AND APPARATUS FOR COMPUTER VISION ANALYSIS OF SPIN RATE OF MARKED PROJECTILES

(71) Applicant: United States of America, as represented by the Secretary of the Navy, Washington, DC (US)

(72) Inventors: Oleg A. Yakimenko, Seaside, CA (US); Mathias N. Kolsch, Carmel, CA (US); Ryan J. Decker, Hoboken, NJ (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 321 days.

(21) Appl. No.: 14/939,032

(22) Filed: Nov. 12, 2015

Related U.S. Application Data

(60) Provisional application No. 62/079,391, filed on Nov. 13, 2014.

(51) Int. Cl.
*G06K 9/00* (2006.01)
*G06T 7/20* (2017.01)
(Continued)

(52) U.S. Cl.
CPC ....... *G06K 9/00744* (2013.01); *G06K 9/4604* (2013.01); *G06K 9/52* (2013.01);
(Continued)

(58) Field of Classification Search
CPC .... G06K 9/00744; G06K 9/4604; G06K 9/52; G06T 7/0085; G06T 7/20; G06T 7/60;
(Continued)

(56) References Cited

U.S. PATENT DOCUMENTS 8,651,381 B2 * 2/2014 Rudich ................ F41G 11/001
235/404
9,563,964 B1 * 2/2017 Yakimenko ............... G06T 7/20
(Continued)

OTHER PUBLICATIONS

Hughett, "Projectile velocity and spin rate by image processing of synchro-ballistic photography," Jan. 1, 1991, SPIE, Proc. SPIE 1346, Ultrahigh- and High-Speed Photography, Videography, Photonics, and Velocimetry '90, vol. 1346, p. 237-248.*
(Continued)

*Primary Examiner* — Stephen R Koziol
*Assistant Examiner* — Timothy Choi
(74) *Attorney, Agent, or Firm* — Naval Postgraduate School; Lisa A. Norris; James B. Potts

(57) ABSTRACT

Methods and systems for determining a spin rate of a projectile are provided. A receiving module receives a video of a launch of a projectile in which the projectile having at least one marking disposed thereon. A segmenting module segments a plurality of shapes of the projectile from the video. The segmenting module includes a sensitivity module configured to increase a sensitivity of the video to find the projectile in the video. An extraction module extracts at least one column of pixels of the at least one marking from the shapes. A generating module generates a stripe pixel column history image from the at least one column of pixels. A calculating module calculates a spin rate of the projectile from the stripe pixel column history image.

19 Claims, 23 Drawing Sheets

(51) Int. Cl.
*G06T 7/00* (2017.01)
*G06K 9/46* (2006.01)
*G06T 7/60* (2017.01)
*G06K 9/52* (2006.01)

(52) U.S. Cl.
CPC .............. *G06T 7/0085* (2013.01); *G06T 7/20* (2013.01); *G06T 7/60* (2013.01); *G06T 2207/20056* (2013.01); *G06T 2207/20061* (2013.01); *G06T 2207/20112* (2013.01); *G06T 2207/30241* (2013.01)

(58) Field of Classification Search
CPC . G06T 2207/20056; G06T 2207/20061; G06T 2207/20112; G06T 2207/30241
See application file for complete search history.

(56) References Cited

U.S. PATENT DOCUMENTS

| | | | |
|---|---|---|---|
| 9,721,352 B1* | 8/2017 | Yakimenko | G06T 7/2033 |
| 2009/0040308 A1* | 2/2009 | Temovskiy | G02B 27/0068 |
| | | | 348/158 |

OTHER PUBLICATIONS

Decker et al., "An Automated Method for Computer Vision Analysis of Cannon-Launched Projectile Video", Sep. 2014, ATSM, Journal of Testing and Evaluation, vol. 42, No. 5, p. 1248-1256.*

* cited by examiner

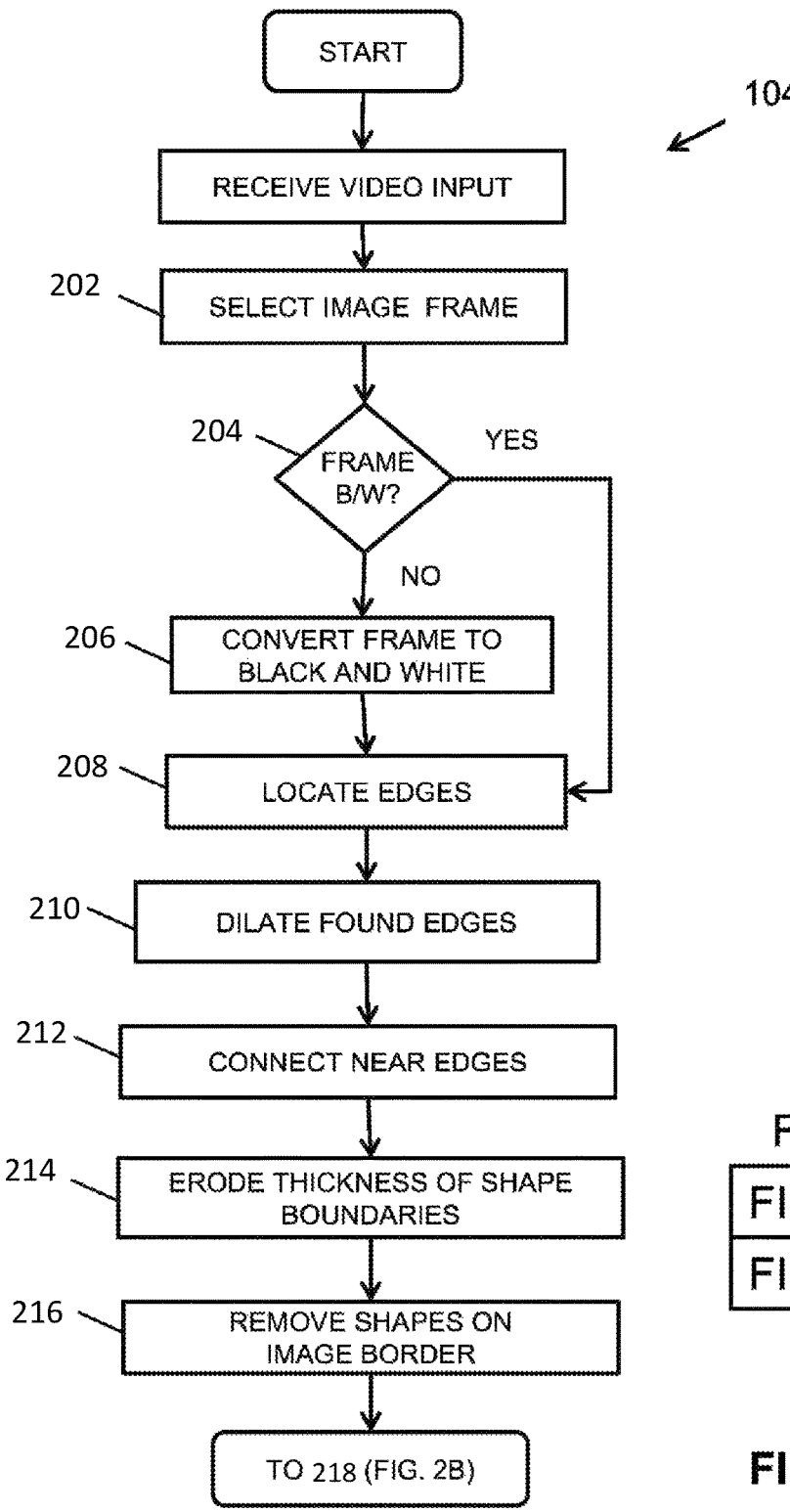

METHOD AND APPARATUS FOR COMPUTER VISION ANALYSIS OF SPIN RATE OF MARKED PROJECTILES

CROSS-REFERENCE TO RELATED APPLICATIONS

This application claims the benefit of U.S. Provisional Application No. 62/079,391 filed Nov. 13, 2014, which is hereby incorporated in its entirety by reference.

INCORPORATION BY REFERENCE

[Reference 1] Itronix. "DRS's Flight Follower System." Specification Sheet. www.itronix.com/pdf/DRS_Flight_Follower.pdf. Accessed July, 2012;

[Reference 2] Specialised Imaging. Trajectory Tracker User Manual. 41690 Enterprise Circle North. Temecula, Calif., 92590;

[Reference 3] Photron. "Fastcam SA5 Ultra High-Speed Video System." Specification Sheet. <www.photron.com/datasheet/FASTCAM_SA5>. Accessed July, 2012;

[Reference 4] Decker, R., Totten, A., Stout, C., Hollis, M., Flyash, B., Cantatore, D., and Einstein, S. "Instrumented Magnet Projectile: Results of Initial Testing and Analysis." Armaments Research, Development, and Engineering Center, Picatinny Arsenal N.J. Technical Report ARAET-TR-XXXXX. November, 2012;

[Reference 5] Davis, B., Harkins, T., Hepner, D., Patton B., and Hall, R. "Aeroballistics Diagnostic Fuze (DFuze) Measurements for Projectile Development, Test, and Evaluation". Army Research Laboratories, Aberdeen Md. ARL-TR-3204, July 2004;

[Reference 6] Decker, R. J., and Yakimenko, O. A., Hollis, M. S., and Sweeney, P. J. "On the Development of the Artillery Flight Characterization Electronics Rescue Kit." Proceedings of the 23rd Aerodynamic Decelerator Systems Conference. American Institute of Aeronautics and Astronautics. May, 2011;

[Reference 7] Ferguson, E. M., Bossoli, R. B., and Jara, E. A. "Technique for Measuring the Spin-rate of Kinetic Energy Projectiles." Army Research Laboratories, Aberdeen Md. ARL-MR-60. April 1993;

[Reference 8] 1976 US Army Test and Evaluation Command Test Operations Procedure: Measurement of Projectile Rate of Spin. Test Operational Procedure. US Army Aberdeen Proving Ground, Maryland;

[Reference 9] Arrow Tech Associates, Inc. "Use of Yaw Cards During Projectile Development." Yaw Card White Paper. July 2010;

[Reference 10] Project Manager, Combat Ammunition Systems. "Base IRAD Obturator Material Characterization." XM982 Excalibur. Armaments Research, Development, and Engineering Center, Picatinny Arsenal N.J. January, 2011. Unpublished data;

[Reference 11] Photo-Sonics, Inc. "TrackEye Motion Analysis Software." www.photosonics.com/trackeye_software.htm. Accessed July, 2012;

[Reference 12] Decker, R., Kolsch, M., and Yakimenko, O. "An Automated Method for Computer Vision Analysis of Cannon-Launched Artillery Video," in Proceedings of the 27th International Ballistics Symposium, Freiburg, Germany, 2013;

[Reference 13] MATLAB. Version 7.12.0 (R2011a). Natick, Mass.: The MathWorks Inc. 2011;

[Reference 14] Canny, J. A. Computational Approach to Edge Detection, IEEE Trans. Pattern Analysis and Machine Intelligence, 8(6):679-698, 1986;

[Reference 15] Hough, P. V. C. Machine Analysis of Bubble Chamber Pictures. Proc. Int. Conf. High Energy Accelerators and instrumentation, 1959;

[Reference 16] Carlucci, D., and Jacobsen, S. Ballistics, Theory and Design of Guns and Ammunition, CRC Press, 2008, pp. 169-305;

[Reference 17] McCoy, R. Modern Exterior Ballistics: The Launch and Flight Dynamics of Symmetric Projectiles, Schiffer Publishing, Atglen, P A, 1999;

[Reference 18] Yakimenko, O. Engineering Computations and Modeling in MATLAB/Simulink. AIAA, Reston, Va., 2011;

[Reference 19] Davis, B., Guidos, B., and Harkins, T. "Complementary Roles of Spark Range and Onboard Free-Flight Measurements for Projectile Development." Army Research Laboratory Report No. ARL-TR-4910. August 2009;

[Reference 20] Kolsch, M. Lecture Notes. Computer Science 4330, Computer Vision. Naval Postgraduate School. September, 2010;

[Reference 21] Tate, J. "Extraction of Aeroballistic Coefficients from Flight Follower Data." Ballistic Engineering Consulting. Presentation Notes. 2011;

[Reference 22] Kovesi, P. "Non-Maxima Suppression Source Code." School of Computer Science and Software Engineering, University of Western Australia. 2005;

[Reference 23] Brigham, E. O. The Fast Fourier Transform. New York: Prentice-Hall. 2002;

[Reference 24] Davis S. "Aeroballistic Diagnostic Fuze (DFuze) Measurements." Unpublished Report. Army Research Laboratories. Aberdeen Proving Ground, M D. 2006; and

[Reference 25] Rotundo, A., and Sweeney, P. "Instrumented Ballistic Test Projectile Data." Unpublished Report. Armaments Research, Development, and Engineering Center. Picatinny Arsenal, N J. 2012 are incorporated herein by reference in their entirety.

BACKGROUND OF THE PRESENT DISCLOSURE

1. Field of the Present Disclosure

It is important to accurately quantify the flight parameters of an artillery projectile to better understand the behavior and performance of a weapon system. The gyroscopic stability, accuracy, and total range of spinning bullets are highly dependent on their rate of spin.

One of the benefits of modern high-speed video equipment is the ability to view the rotation of a spinning artillery round while in free-flight. When recorded at a rate of 10,000 frames per second, it is possible to smoothly view the rotation of a spin-stabilized projectile, even though it may be spinning at 300 revolutions per second (Hz). This capability has led to the practice of painting artillery projectiles with black and white longitudinal stripes along the direction of the projectile axis to make it easier to visualize and quantify rotation.

The stripes often continue the length of a projectile, but in some tests the paint along the base and body of the projectile become damaged by exposure to the propelling gases or through contact with the cannon bore during launch. Fortunately, the excellent image quality captured by Flight Follower [see Reference 1] or Trajectory Tracker [see Reference 2] video systems with SA5 Fastcams [see Reference 3] allows spin-analysis to be conducted when only the forward ogive region of the projectile is painted as shown in FIG. 3 [see Reference 4].

2. Description of the Related Art

There are several methods in practice to measure the spin-rate of artillery projectiles. The most reliable means currently available involves the use of on-board instrumentation systems with solar-sensing photodiodes, or inertial sensors such as gyroscopes and accelerometers that can telemeter sensor readings for subsequent analysis. These systems such as the DFuze [see Reference 5] developed at Aberdeen Research Labs (ARL) or the Aerofuze [see Reference 6] in development at the Armaments Research, Development and Engineering Center (ARDEC) are versatile data collection systems that can be threaded into the fuze-well of most artillery projectiles. These systems, however, are very costly and can only be used once before being destroyed at impact. In addition, they require extensive post-processing operations, often making them unfeasible for small weapons programs.

Radar data analysis is another means of measuring projectile spin-rate. These systems are even capable of recording spin-rate measurements for more than one region on a projectile if the base rotates independently of the projectile body. A limitation of radar analysis is that it often cannot be used to measure spin-rate immediately after muzzle exit, and can sometimes only deliver reliable data for a portion of the projectile's flight because the spin-rate for fin-stabilized projectiles can vary in an unpredictable manner throughout flight. Accurate radar readings may require geometric asymmetries or modifications on the base of the projectile to distinguish the Doppler shift as the projectile rotates [see Reference 7]. Therefore, it may not be possible to accurately determine the spin-rate from radar data for some rockets or projectiles with base-bleed systems.

Older methods used to measure spin-rate include the use of yaw cards. At various locations along the line of fire, large pieces of cardboard or soft material are constructed. After firing, the shape of the hole made by the projectile is examined and compared to a template to estimate the pitch and yaw angles of the projectile as it passed through the card [see Reference 8]. By placing a small pin or using a paint-smear on the surface projectile, the roll position can also be recorded on the yaw card. Limitations of yaw cards are that they require extensive setup before and after each shot, they deliver few data points for curve fitting, and they limit the testing conditions to horizontal firing or firing at very low quadrant elevations (QEs) of less than a few hundred mils. These methods have documented accuracies within 1-2%. [see Reference 9]

Due to improvements in range video systems and camera technology, analysis of projectile launch video is also now commonly conducted to examine the spin-rate of projectiles. Most of this work is conducted manually whereby an operator estimates the time that a painted stripe passes through the center axis of the projectile, or counts the number of rotations observed in a given amount of time. This type of analysis can be extremely tedious if analyzing numerous projectile launches, and the precision is limited to the frame rate even if the best frame is correctly identified for each stripe. As with all data analysis techniques that require operator interaction, manual data reduction is also subject to human error, and spin-rate estimates from different operators has in some cases varied by as much as 40% [see Reference 10].

A software package called Track-Eye developed by PhotoSonics is capable of man-in-the-loop computer vision analysis of projectile video by tracking specific features on objects in a video [see Reference 11]. Limitations of this type of analysis are that it requires operators to be trained in the specific program, and often requires user interaction to re-select points on the projectile to track. In addition, Track-Eye may require multiple camera systems to track rotating features on a projectile used to measure spin-rate.

SUMMARY OF THE PRESENT DISCLOSURE

In accordance with one embodiment of the present disclosure, a computer-implemented method of determining a spin rate of a projectile is provided. The method includes receiving, with a receiving module, a video of a launch of a projectile in which the projectile has at least one marking disposed thereon; segmenting, with a segmenting module, a plurality of shapes of the projectile from the video, the segmenting module being configured to increase a sensitivity of the video to find the projectile in the video; extracting, with an extraction module, at least one column of pixels of the at least one marking from the shapes; generating, with a generating module, a stripe pixel column history image from the at least one column of pixels; and calculating, with a calculating module, a spin rate of the projectile from the stripe pixel column history image.

In accordance with another embodiment of the present disclosure, a system for determining a spin rate of a projectile is provided. The system includes a receiving module configured to receive a video of a launch of a projectile in which the projectile has at least one marking disposed thereon. A segmenting module is configured to segment a plurality of shapes of the projectile from the video. The segmenting module includes a sensitivity module configured to increase a sensitivity of the video to find the projectile in the video. An extraction module is configured to extract at least one column of pixels of the at least one marking from the shapes. A generating module is configured to generate a stripe pixel column history image from the at least one column of pixels. A calculating module is configured to calculate a spin rate of the projectile from the stripe pixel column history image.

In accordance with another embodiment of the present disclosure, a system for determining a spin rate of a projectile is provided. The system includes a receiving module configured to receive a video of a launch of a projectile in which the projectile has at least one marking disposed thereon. A segmenting module is configured to segment a plurality of shapes of the projectile from the video. The segmenting module includes a sensitivity module configured to increase a sensitivity of the video to find the projectile in the video is greater than or equal to a predefined sensitivity threshold. An extraction module is configured to extract at least one column of pixels of the at least one marking from the shapes. A generating module is configured to generate a stripe pixel column history image from the at least one column of pixels. A calculating module is configured to calculate a spin rate of the projectile from the stripe pixel column history image with at least one of a Fast Fourier transform and a Hough transform.

Embodiments in accordance with the present disclosure are best understood by reference to the following detailed description when read in conjunction with the accompanying drawings.

BRIEF DESCRIPTION OF THE DRAWINGS

FIGS. 2A and 2B illustrate a process flow diagram of a method for segmenting a projectile shape in a video frame in an operation of the method of FIG. 1 and in accordance with one embodiment of the present disclosure.

Embodiments in accordance with the present disclosure are further described herein with reference to the drawings.

DETAILED DESCRIPTION OF THE PRESENT DISCLOSURE

High-speed video has been used by the Army to measure the spin-rate of both spin-stabilized and fin-stabilized artillery projectiles. Often at test ranges, state-of-the-art video systems are used by ballistics engineers to verify critical launch events following muzzle exit. From manual analysis of these videos, important performance metrics such as velocity, pitch angle, and spin-rate can be estimated. To do this, operators are able to step through the video frames and record the time that certain fiducial markings or numbered stripes are observed on the projectile as it rotates.

The methods and systems described herein are automated processes to calculate spin-rate from launch video of spin-stabilized artillery projectiles painted with stripes. Image processing and computer vision techniques are employed to segment the shape of the projectile and extract the stripe pattern in each video frame. The most accurate algorithm estimates are validated to within 0.02% for synthetic flight video and within 0.13% of manual analysis for real flight video. The sensitivities of the methods to image resolution, video frame rate, and the length of flight captured are evaluated as well. Areas of continued research and recommendations for increasing the accuracy of measurements in future tests are also identified.

Figure 1:
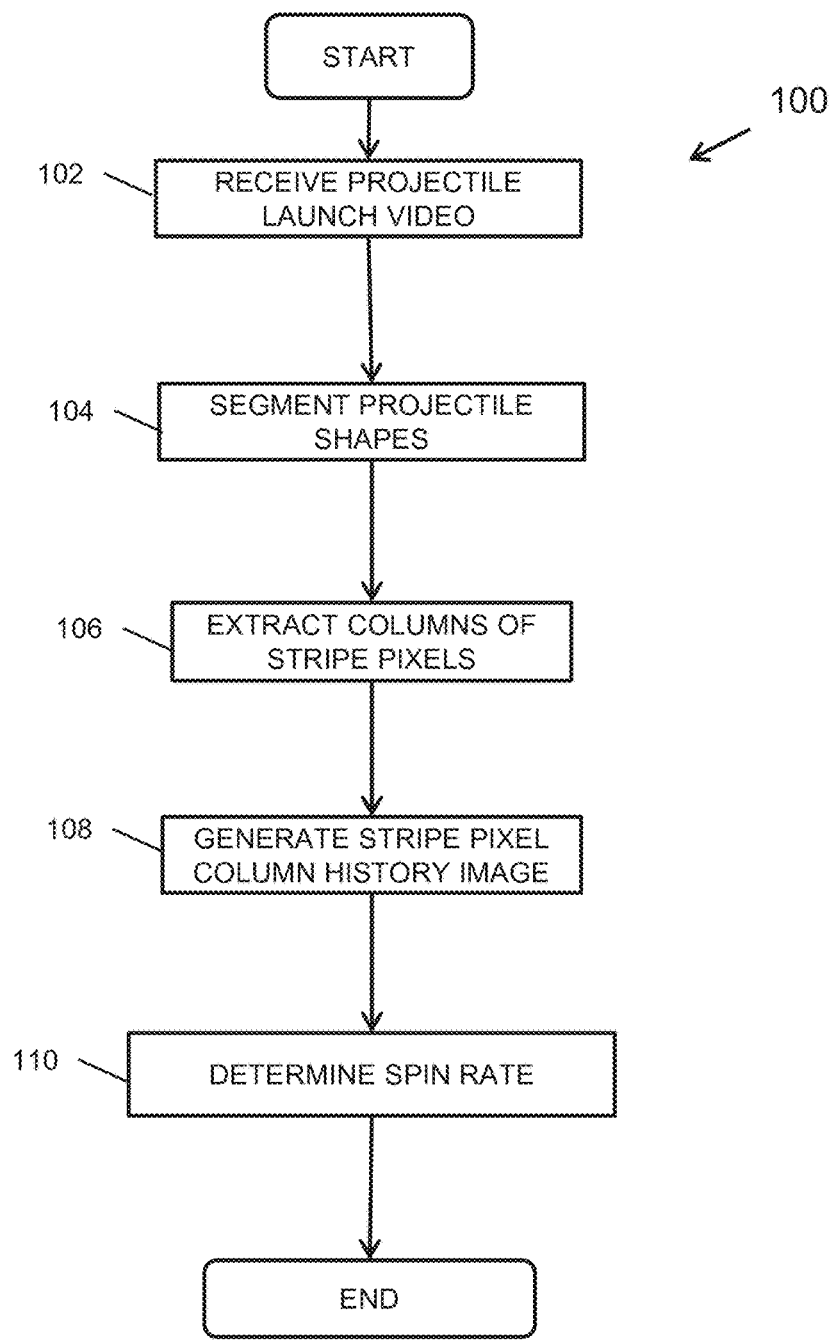
FIG. 1 illustrates a process flow diagram of a method for determining a spin rate of a projectile in accordance with one embodiment of the present disclosure.

FIG. 1 illustrates an overview of a method 100 for determining a spin rate of a projectile according to an exemplary embodiment of this disclosure.

The method 100 includes: receiving a projectile launch video (102); segmenting a plurality of projectile shapes (104); extracting columns of stripe pixels from the segmented shapes (106); generating a stripe pixel column history image from the extracted columns (108); and determine a spin rate of the projectile from the stripe pixel column history image (110).

At 102, a launch video of a projectile from is received, such as from at least one camera/tracker system (not shown). During recording of a projectile launch, a recorded launch video and a mirror rotation data can be generated (e.g., in a digital format).

At 104, a plurality of projectile shapes is segmented from the launch video. For example, the projectile can have one more markings disposed thereon. The markings can be one or more stripes that are painted on a portion (e.g., a nose) of the projectile. The stripe can extend from the nose towards a center of the projectile, or alternatively to a tail of the projectile. The stripe can be extracted using a segmentation process. The projectile stripe can be compared to an Active Shape Model (ASM), as described in more detail below.

Figure 2B:
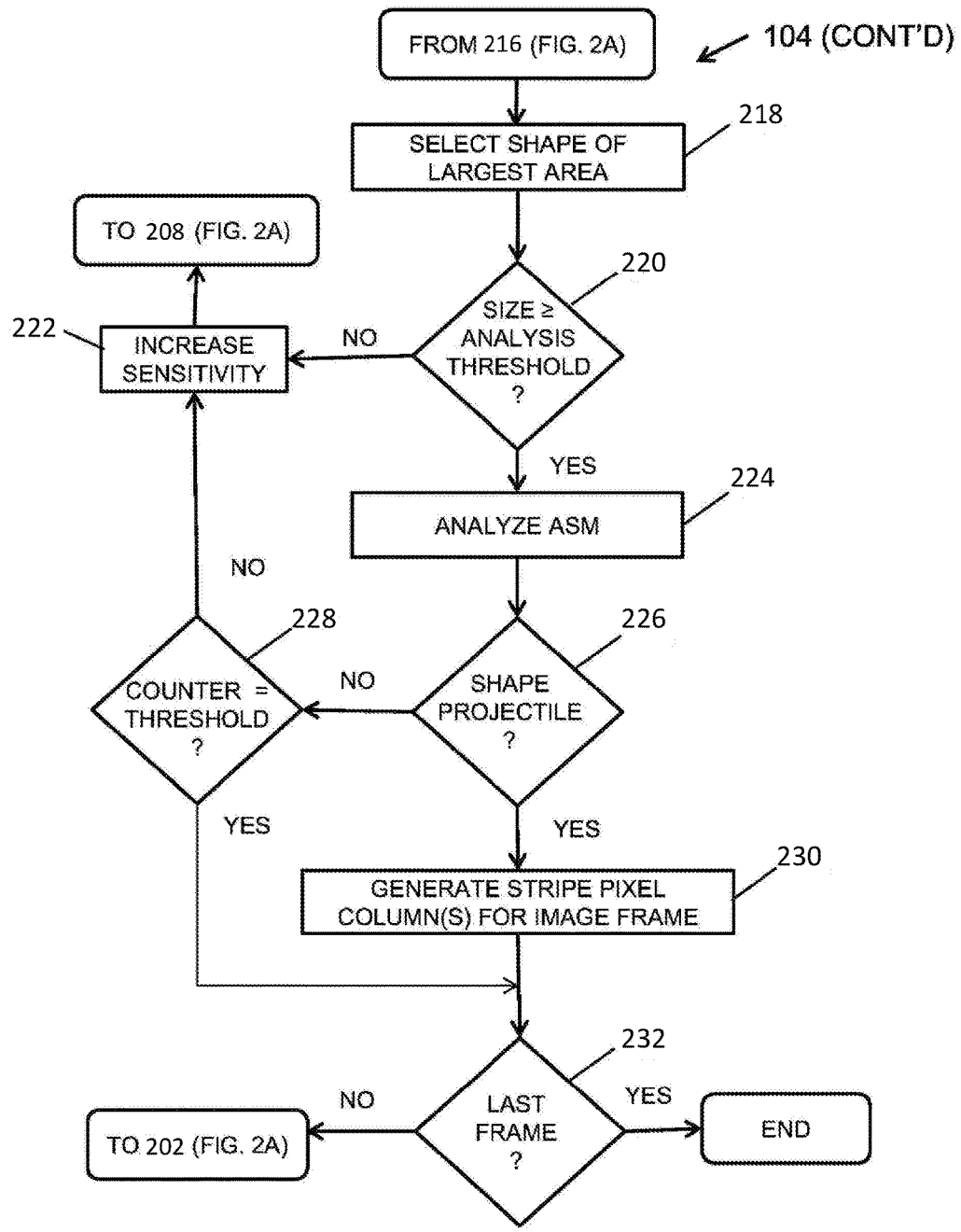

FIGS. 2A and 2B illustrates a process flow diagram of 104 for segmenting a projectile shape in a video frame in accordance with one embodiment of the present disclosure. In one embodiment, the method 104 is used for segmenting a projectile shape, if any, in each video frame of a received launch video in the method 100 (FIG. 1). 104 (FIGS. 2A and 2B) includes: selecting an image frame from the video 202; determining whether the selected image frame is a black and white image 204; converting the selected image to a black and white image when the selected image frame is not a black and white image 206; locating a plurality of edges from the image frame 208; dilating the plurality of edges 210; connecting at least two of the plurality of the edges adjacent each other to define at least one shape 212; eroding a thickness of a boundary of the at least one shape 214; removing the at least one shape from a border of the image, the border being defined by the plurality of edges 216; selecting a shape from the at least one shape having a largest area of the at least one shape 218; determining when a size of the shape with the largest area is greater than or equal to a predefined sensitivity threshold 220; repeating or reprocessing 202-220 when the size of the shape with the largest area is less than the predefined sensitivity threshold while increasing the sensitivity of the video until the size of the shape with the largest area is less than the predefined sensitivity threshold is greater than or equal to the predefined sensitivity threshold 222; analyzing an active shape model of the shape with the largest area when the size of the shape with the largest area is greater than or equal to the predefined sensitivity threshold 224; determine when the shape with the largest area is the projectile from the video 226; determine the number of iterations of 202-220 have occurred when the shape with the largest area is determined not to be the projectile and increasing the sensitivity of the video when the number of iterations of 202-220 is less than a predefined iteration threshold and ceasing segmenting the plurality of shapes of the projectile from the video when the number of iterations of 202-220 is equal to the predefined iteration threshold 228; generating a stripe pixel column for the image frame when the shape with the largest area is determined to be the projectile in the video 230; determine when the image frame is the last image frame in the video and repeating 202-220 when the image frame is not the last image frame in the video and extracting at least one column of pixels of the at least one marking from the shapes from the image frame 232.

Figure 3:
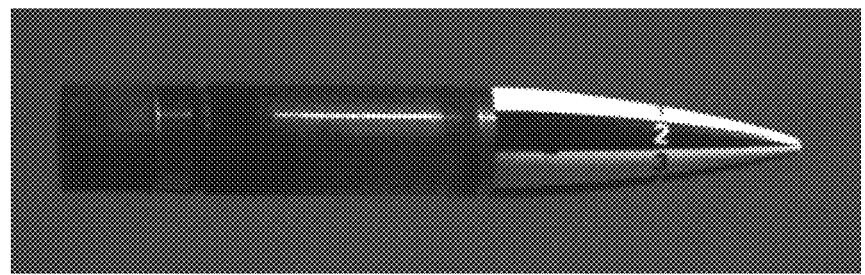
FIG. 3 illustrates an example of a projectile having one or more stripes disposed thereon.

At 202, an image frame is selected from the launch video. For example, the launch video includes sequential video frames taken of a projectile launch. An image frame (e.g., an initial or first image frame) is selected for segmentation. Each video frame can include information, such as time, frame number, and the video frame rate. In one embodiment, optical character recognition is used to read selected information such as the time, frame number, and the video frame rate on each video frame. As described above, the projectile can have one more markings disposed thereon. As shown in FIG. 3, the markings can be one or more stripes that is painted on a portion (e.g., a nose) of the projectile. The stripe can extend from the nose towards a center of the projectile, or alternatively to a tail of the projectile. The image frames of the launch video also includes information (e.g., location and orientation) of the at least one stripe of the projectile.

At 204 (FIGS. 2A and 2B), a determination is made whether or not the selected image frame is a black and white image. For example, the projectile may appear in the image as a first color (e.g., white) and the stripe may appear in the image as a different second color (e.g., black). If the image were in color (e.g., with more than two colors), it can be difficult to distinguish between the stripe and the projectile and, thus, it is more difficult to determine the spin rate of the projectile.

At 206, the selected image is converted to a black or white image if the image is determined to be not black and white (e.g., the image is determined to be a color image). The selected frame is then converted to a black and white video frame, e.g., converted from color to grayscale using conventional techniques.

In 208-216, smoothing operations are applied to the selected image frame to suppress noise in the video frame image. Edge detection techniques with variable sensitivity are combined with morphological operations to identify candidate projectile shapes in the image. Candidate shapes in contact with the image border are removed. This process is illustrated in FIGS. 4-9.

Figure 4:
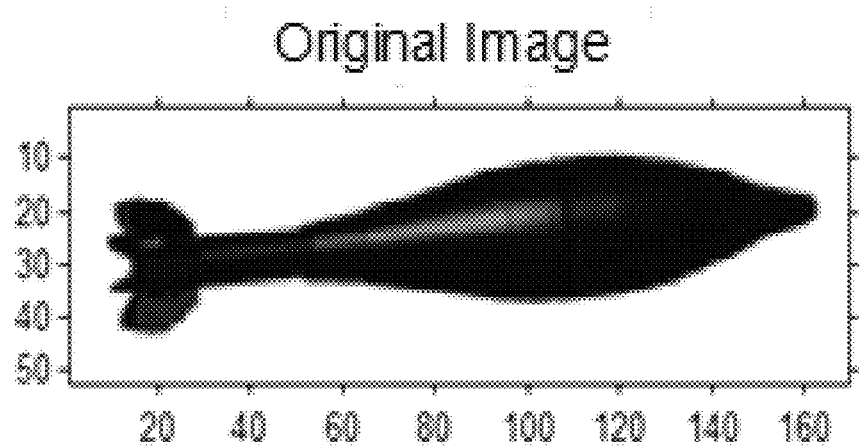
FIG. 4 illustrates an original image of a projectile in an image frame of a launch video.

At 208, a plurality of edges of the selected image is located. For example, FIG. 4 shows an original image of a projectile in an image frame (i.e., the selected frame) of the launch video. One or more edges of the shape of the projectile are located or found in the image frame. The edges can be located using any suitable technique or algorithm (e.g., Canny technique, Sobel Filter Method, and the like).

Figure 5:
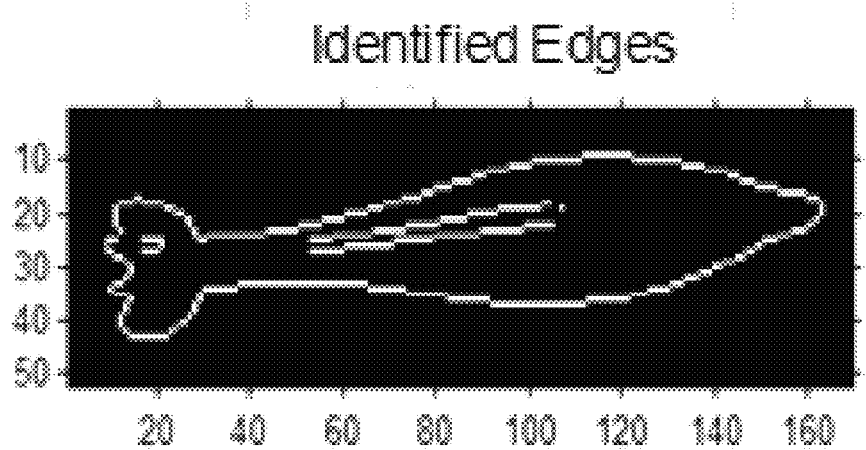
FIG. 5 illustrates an initial binary image with found edges generated from the image of FIG. 4 in accordance with one embodiment of the present disclosure.

FIG. 5 illustrates an initial binary image with found edges generated from the image of FIG. 4.

Figure 6:
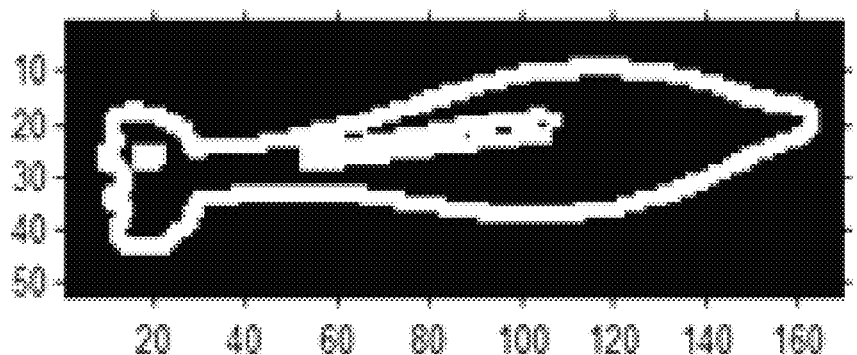
FIG. 6 illustrates a binary image after dilation of found edges in the binary image of FIG. 5 in accordance with one embodiment of the present disclosure.

At 210, the located edges are dilated. The located edges are dilated so they are more easily viewable. The edges can be dilated using any suitable technique. FIG. 6 shows a binary image after dilation of the located edges in the binary image of FIG. 5.

Figure 7:
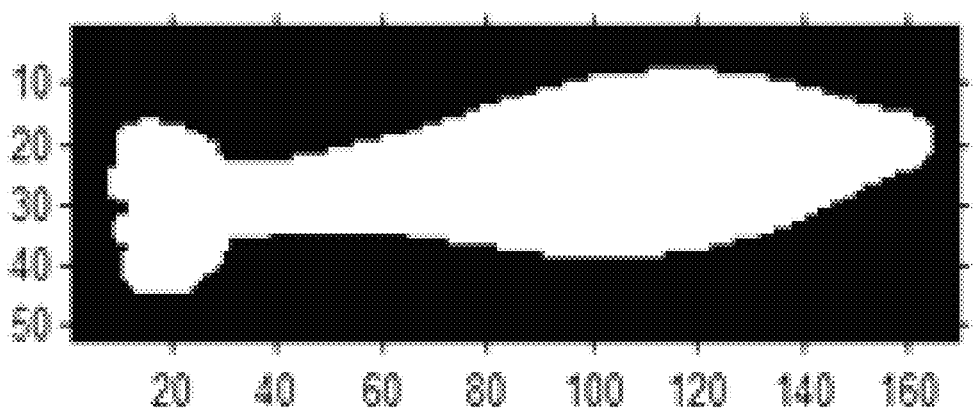
FIG. 7 illustrates a binary image after filling of holes in the binary image of FIG. 6 in accordance with one embodiment of the present disclosure.

At 212, at least two of the plurality of the edges adjacent each other are connected together to define at least one shape. For example, adjacent edges of the dilated edges are connected to form shape boundaries. The adjacent edges can be connected together using any suitable technique. FIG. 7 shows a binary image after filling of holes in the binary image of FIG. 6.

Figure 8:
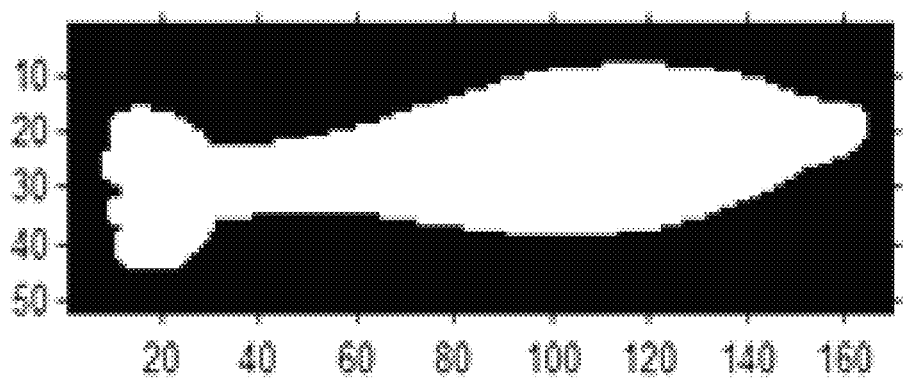
FIG. 8 illustrates a binary image after clearing the border of the binary image of FIG. 7 in accordance with one embodiment of the present disclosure.

At 214, a thickness of a boundary of the at least one shape is eroded. The boundaries are eroded so the image is more clear (i.e., the projectile is more visible). The boundaries can be eroded using any suitable technique. FIG. 8 shows a binary image after clearing the border of the binary image of FIG. 7.

Figure 9:
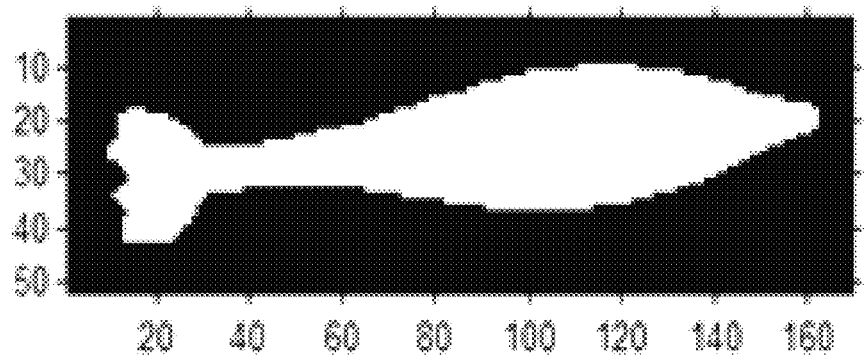
FIG. 9 illustrates a resultant segmented binary image in accordance with one embodiment of the present disclosure.

At 216, the at least one shape is removed from a border of the image in which the border is defined by the plurality of edges. The shape is removed so that the image (i.e., the projectile) is more visible. The shape can be removed using any suitable technique. FIG. 9 shows a resultant segmented binary image in which the shape of FIG. 8 is removed.

At 218, a shape from the at least one shape having a largest area of the at least one shape is selected. For example, the projectile in the image frame has the shape with the largest area in the image frame. As a result, one or more shapes that are located on the image border (i.e., the border of the projectile) are removed. By doing so, shapes on the outside of the border of the projectile in the image frame (e.g., telephone poles, mountains, trees, cacti, and the like) are not considered when looking for the largest shape (i.e., the projectile).

At 220, a determination is made as to when a size of the shape with the largest area is greater than or equal to a predefined sensitivity threshold. Stated another way, the size of the projectile in the image frame is compared to the predefined sensitivity threshold to determine if the image of the projectile is actually the projectile in the launch video. If the size of the shape with the largest area (i.e., the projectile) is greater than or equal to the predefined threshold, then the shape with the largest area is determined to actually be the projectile. If the size of the shape with the largest area is less than the predefined sensitivity, then the shape with the largest area is not the projectile. This determination can be made using any suitable techniques.

At 222, a determination that 202-220 should be repeated when the size of the shape with the largest area is less than the predefined sensitivity threshold. For example, the sensitivity threshold of the video is increased, so that shapes with larger areas can be identified (i.e., using 202-220). For example, in one embodiment, the predefined sensitivity threshold can be an area of approximately 3,000 pixels. 202-220 is repeated until the sensitivity of the video is at a level such that an image thought to be the projectile is obtained (i.e., by having more than 3,000 pixels). Alternatively, when the size of the shape is greater than or equal to the analysis threshold, the shape is determined large enough for further processing and analysis of the video continues.

At 226, an active shape model of the shape with the largest area is analyzed when the size of the shape with the largest area is greater than or equal to the predefined sensitivity threshold. For example, when the largest candidate shape has an area greater than 3,000 pixels, (i.e., the predefined sensitivity threshold), the shape is compared to an Active Shape Model (ASM). An ASM is a numerical model used to represent natural shape variability of a training set of similar objects. When the candidate shape is within a threshold distance from the ASM, the pixel locations of that shape are classified as belonging to the projectile. In one example, the shape is analyzed for a corresponding ASM by fitting. In one embodiment, the segmented shape is fitted to the ASM using the measurement of a pitch angle $\Phi_{obs}$. In one embodiment the nose region of the projectile is defined as the five percent of pixels that are farthest from the central moment of the entire projectile shape. Then, $\Phi_{mobs}$ is calculated from the angle between the central moment of the nose region and the central moment of the projectile using Equation 1

$$\Phi_{obs} = \tan^{-1}\left(\frac{\text{Nose}_{moment,y} - \text{Center}_{moment,y}}{\text{Nose}_{moment,x} - \text{Center}_{moment,x}}\right). \qquad \text{Equation 1}$$

This results in a robust measurement of $\Phi_{obs}$ which is dependent upon the average of hundreds of pixels as opposed to the precision of just a single pixel as used in other conventional methods such as manual scoring.

At 226, a determination is made as to whether the shape with the largest area is the projectile from the video. For example, a determination is made whether the shape is a projectile, (i.e., whether the shape is correctly fitted to the ASM). The variation is compared between the segmented shape and the projectile. If the variation is below a threshold (e.g., an area of 3 pixels), then the shape in the image is confirmed as the projectile from the launch video.

At 228, a determination is made as to the number of iterations of 202-220 have occurred when the shape with the largest area is determined not to be the projectile. In some embodiments, when the shape in the image frame did not fit the ASM model, a determination is made as to how many times the image frame has been reprocessed (i.e., by 202-220) and is compared to a predefined iteration threshold. For example, the predefined iteration threshold can be set at 10 iterations. If the image frame has been reprocessed less than the predefined iteration threshold (i.e., the image frame has been reprocessed less than 10 times), the analysis continues to 222, where the sensitivity is increased. If, however, the image frame is equal to the predefined iteration threshold (i.e., the image frame has been reprocessed 10 times) the analysis ceases and a determination is made that the image frame does not include the projectile.

At 230, a stripe pixel column for the image frame is generated when the shape with the largest area is determined to be the projectile in the video. For example, when the shape in the image frame is correctly fit to the ASM model (i.e., at 226), a sequential stripe pixel history of the image frame is generated. This sequential stripe pixel history is used in 106 (FIG. 1).

At 232, a determination is made as to whether the image frame is the last image frame in the video. For example, if the image frame is not the last frame in the image, 202-230 is repeated until all the image frames of the launch video have been analyzed. If the image frame is the last image frame in the video, the method 104 ceases and continues to 106.

Referring back to FIG. 1, once the images have been segmented at 104, the method 100 continues. At 106, columns of stripe pixels from the segmented shapes are extracted. For example, the stripe pixel columns for each image frame (generated at 230) are retrieved, and columns of the stripe of the segmented shape (i.e., the projectile) are extracted. The stripe pixels can be extracted with any suitable extraction technique.

At 108, a stripe pixel column history image is generated from the extracted columns. For example, the stripe pixel column history includes information about the position of the stripe in the image over time. The pixels at each location of the stripe are taken from the extracted columns to generate the stripe pixel column history image.

At 110, a spin rate of the projectile is determined from the stripe pixel column history image. In one example, the pixel values of the stripe from the stripe pixel column history image are used to calculate the spin rate of the projectile. In one example, a Fast Fourier transform is used to calculate the spin rate of the projectile. In another example, a Hough transform is used to calculate the spin rate of the projectile. Each of these techniques is described in more detail below.

Figure 10:
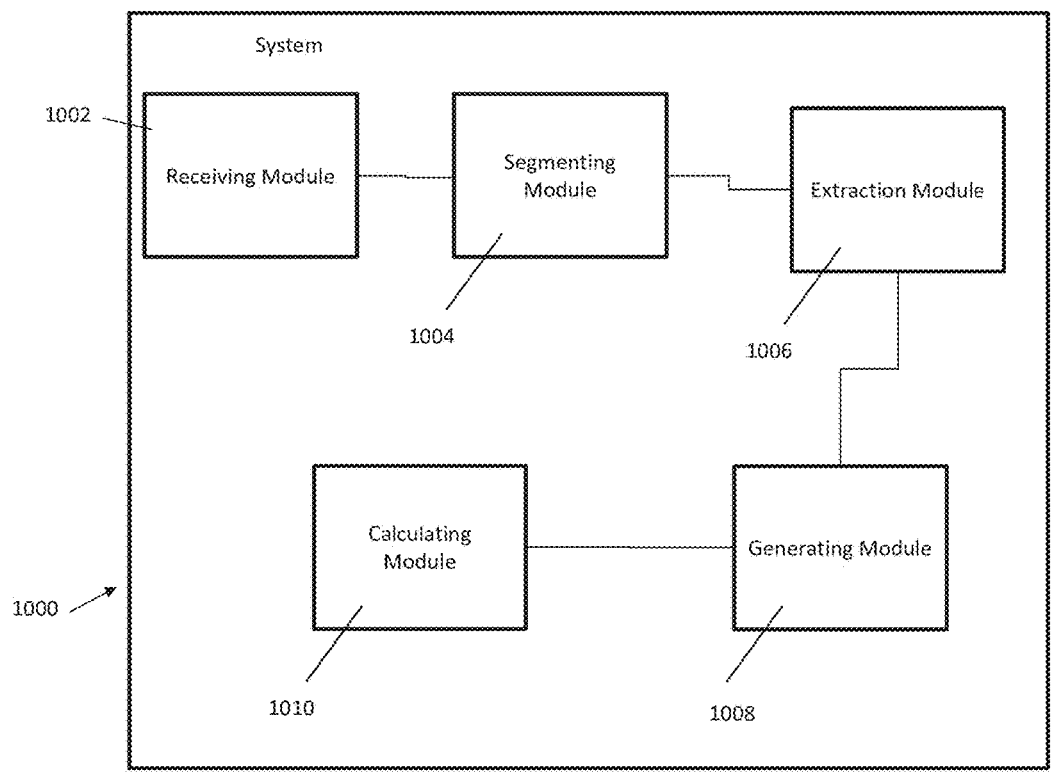
FIG. 10 illustrates a system for determining a spin rate of a projectile in accordance with one embodiment of the present disclosure.

With reference to FIG. 10, shown is a block diagram of a system 1000 to implement the method 100 for determining a spin rate of a projectile according to an exemplary embodiment of this disclosure.

The system 1000 includes a receiving module 1002, a segmenting module 1004, an extraction module 1006, a generating module 1008, and a calculating module 1010. Each of these components 1002-1010 are described in more detail below.

The receiving module 1002 is configured to receive a video of a launch of a projectile (e.g., from one or more camera/tracking systems) in which the projectile has at least one marking disposed thereon. During recording of a projectile launch, a recorded launch video and a mirror rotation data can be generated (e.g., in a digital format).

The segmenting module 1004 is configured to receive the launch video from the receiving module 1002, and segment a plurality of shapes of the projectile from the video. The segmenting module is also configured to increase a sensitivity of the video to find the projectile in the video. The segmenting module 1004 is described in more detail below in reference to FIG. 11.

Referring back to FIG. 10, the extraction module 1006 is configured to receive the segmented shapes from the segmenting module 1004, and extract at least one column of pixels of the at least one marking from the shapes.

The generating module 1008 is configured to receive the pixels of the markings from the extraction module, and generate a stripe pixel column history image from the at least one column of pixels. For example, the stripe pixel column history includes information about the position of the stripe in the image over time. The generating module 1008 is configured to take the pixels at each location of the stripe from the extracted columns to generate the stripe pixel column history image.

The calculating module 1010 is configured to receive the stripe pixel column history image from the generating module, and calculate a spin rate of the projectile from the image. In one example, a Fast Fourier transform is used to calculate the spin rate of the projectile. In another example, a Hough transform is used to calculate the spin rate of the projectile. Each of these techniques is described in more detail below.

Figure 11:
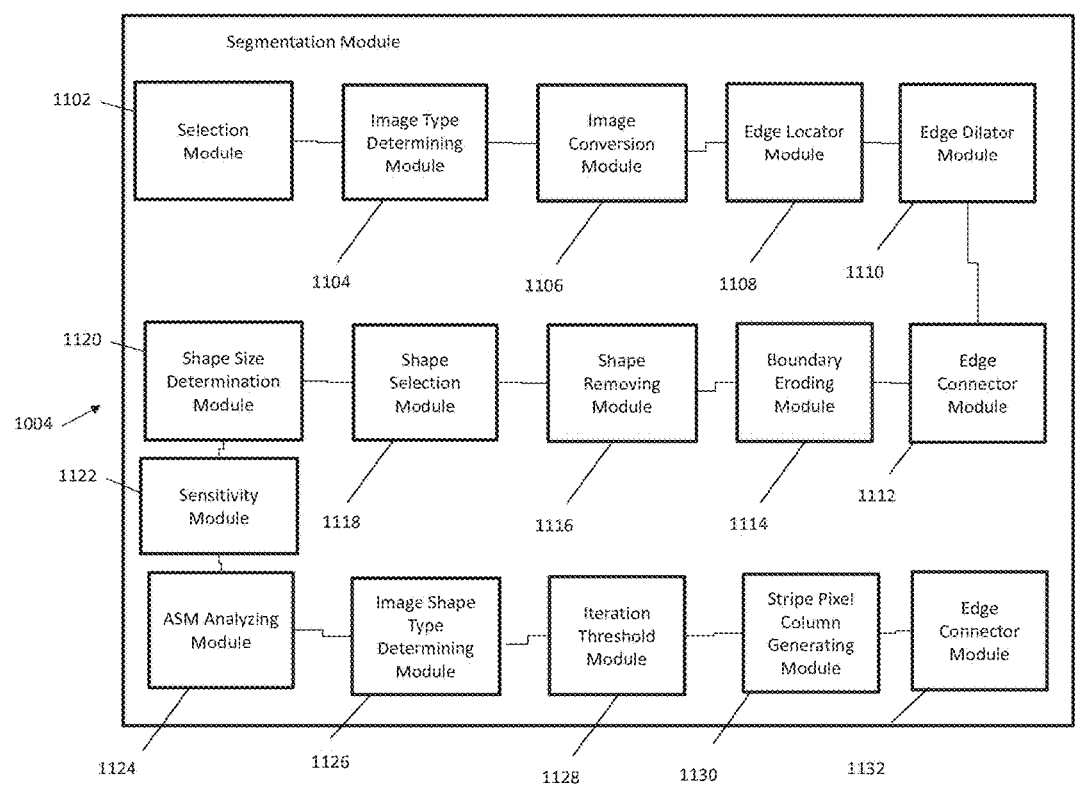
FIG. 11 illustrates a system for segmenting a projectile shape in a video frame in an operation of the system of FIG. 10 and in accordance with one embodiment of the present disclosure.
Figure 12:
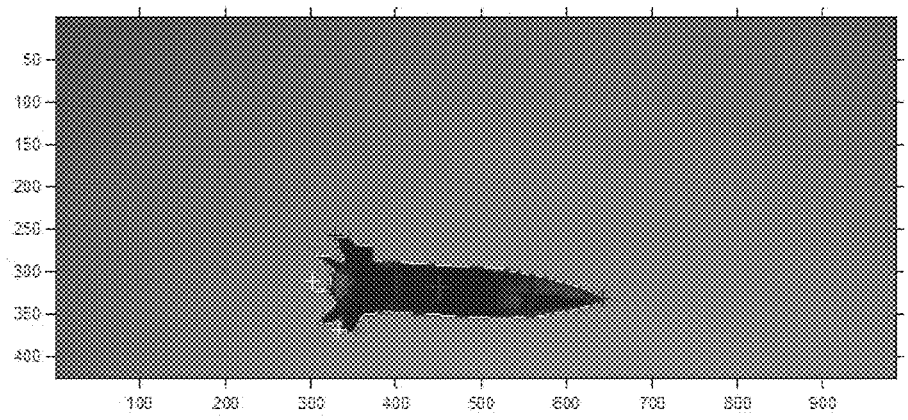
FIG. 12 illustrates a projectile segmentation from an image frame in which the stripes are not visible.

With reference to FIG. 11, shown is a block diagram of the segmenting module 1004 to implement the method 104 for segmenting a plurality of shapes of a projectile from a video according to an exemplary embodiment of this disclosure.

As shown in FIG. 11, the segmenting module 1004 includes a selection module 1102; an image type determining module 1104; an image conversion module 1106; an edge locator module 1108; an edge dilator module 1110; an edge connector module 1112; a boundary eroding module 1114; a shape removing module 1116; a shape selection module 1118; a shape size determination module 1120; a sensitivity module 1122; an ASM analyzing module 1124; an image shape type determining module 1126; an iteration threshold module 1128; a stripe pixel column generating module 1130; and a last frame determination module 1132. Each of these components 1102-1132 are described in more detail below.

The selection module 1102 is configured to select an image frame from the launch video. For example, the launch video includes sequential video frames taken of a projectile launch. An image frame (e.g., an initial or first image frame) is selected for segmentation. Each video frame can include information, such as time, frame number, and the video frame rate.

The image type determining module 1104 is configured to determine whether or not the selected image frame is a black and white image. For example, the projectile may appear in the image as a first color (e.g., white) and the stripe may appear in the image as a different second color (e.g., black). If the image were in color (e.g., with more than two colors), it can be difficult to distinguish between the stripe and the projectile and, thus, it is more difficult to determine the spin rate of the projectile.

The image conversion module 1106 is configured to convert the selected image to a black or white image if the image is determined to be not black and white (e.g., the image is determined to be a color image). The selected frame is then converted to a black and white video frame, e.g., converted from color to grayscale using conventional techniques.

The edge locator module 1108 is configured to locate a plurality of edges of the selected image is located. For example, one or more edges of the shape of the projectile are located or found in the image frame. The edge locator module 1108 can be configured with any suitable edge location technique or algorithm (e.g., Canny technique, Sobel Filter Method, and the like).

The edge dilator module 1110 is configured to dilate the located edges. The located edges are dilated so they are more easily viewable.

The edge connector module 1112 is configured connected together at least two of the plurality of the edges adjacent each other to define at least one shape. For example, adjacent edges of the dilated edges are connected to form shape boundaries.

The boundary eroding module 1114 is configured to erode a thickness of a boundary of the at least one shape is eroded. The boundaries are eroded so the image is more clear (i.e., the projectile is more visible).

The shape removing module 1116 is configured to remove the at least one shape from a border of the image in which the border is defined by the plurality of edges. The shape is removed so that the image (i.e., the projectile) is more visible.

The shape selection module 1118 is configured to select a shape from the at least one shape having a largest area of the at least one shape. For example, the projectile in the image frame has the shape with the largest area in the image frame. As a result, one or more shapes that are located on the image border (i.e., the border of the projectile) are removed. By doing so, shapes on the outside of the border of the projectile in the image frame (e.g., telephone poles, mountains, trees, cacti, and the like) are not considered when looking for the largest shape (i.e., the projectile).

The shape size determination module 1120 is configured to determine when a size of the shape with the largest area is greater than or equal to a predefined sensitivity threshold. Stated another way, the size of the projectile in the image frame is compared to the predefined sensitivity threshold to determine if the image of the projectile is actually the projectile in the launch video. If the size of the shape with the largest area (i.e., the projectile) is greater than or equal to the predefined threshold, then the shape with the largest area is determined to actually be the projectile. If the size of the shape with the largest area is less than the predefined sensitivity, then the shape with the largest area is not the projectile.

The sensitivity module 1122 is configured to determine whether the image should be reprocessed (e.g., with modules 1102-1120) when the size of the shape with the largest area is less than the predefined sensitivity threshold. For example, the sensitivity threshold of the video is increased, so that shapes with larger areas can be identified. For example, in one embodiment, the predefined threshold can be an area of approximately 3,000 pixels. 202-220 is repeated until the sensitivity of the video is at a level such that an image thought to be the projectile is obtained (i.e., by having more than 3,000 pixels). Alternatively, when the size of the shape is greater than or equal to the analysis threshold, the shape is determined large enough for further processing and analysis of the video continues.

The ASM analyzing module 1124 is configured to analyze an active shape model of the shape with the largest area when the size of the shape with the largest area is greater than or equal to the predefined sensitivity threshold. For example, when the largest candidate shape has an area greater than 3,000 pixels, (i.e., the predefined sensitivity threshold), the shape is compared to an Active Shape Model (ASM). An ASM is a numerical model used to represent natural shape variability of a training set of similar objects. For artillery projectiles, the training set consists of images of projectiles having the same number and position of stripes. When the candidate shape is within a threshold distance from the ASM, the pixel locations of that shape are classified as belonging to the projectile. In one example, the shape is analyzed for a corresponding ASM by fitting. In one embodiment, the segmented shape is fitted to the ASM using the measurement of $\Phi_{obs}$ (Equation 1). In one embodiment the nose region of the projectile is defined as the five percent of pixels that are farthest from the central moment of the entire projectile shape.

The image shape type determining module 1126 is configured to determine whether the shape with the largest area is the projectile from the video. For example, a determination is made whether the shape is a projectile, (i.e., whether the shape is correctly fitted to the ASM). The variation is compared between the segmented shape and the projectile. If the variation is below a threshold (e.g., an area of 3 pixels), then the shape in the image is confirmed as the projectile from the launch video.

The iteration threshold module 1128 is configured to determine the number of reprocessing operations have occurred when the shape with the largest area is determined not to be the projectile. In some embodiments, when the shape in the image frame did not fit the ASM model, a determination is made as to how many times the image frame has been reprocessed and is compared to a predefined iteration threshold. For example, the predefined iteration threshold can be set at 10. If the image frame has been reprocessed less than the predefined iteration threshold (i.e., the image frame has been reprocessed less than 10 times), the sensitivity module 1122 increases the sensitivity of the video. If, however, the image frame is equal to the predefined iteration threshold (i.e., the image frame has been reprocessed 10 times) the analysis ceases and a determination is made that the image frame does not include the projectile.

The stripe pixel column generating module 1130 is configured to generate a stripe pixel column for the image frame when the shape with the largest area is determined to be the projectile in the video. For example, when the shape in the image frame is correctly fit to the ASM model (i.e., by the ASM analyzing module 1124), a sequential stripe pixel history of the image frame is generated. This sequential stripe pixel history is used by the extraction module 1006 (FIG. 10).

The last frame determination module 1132 is configured to determine whether the image frame is the last image frame in the video. For example, if the image frame is not the last frame in the image, the processes of the modules 1102-1130 is repeated until all the image frames of the launch video have been analyzed. If the image frame is the last image frame in the video, the extraction module 1006 extracts the stripe pixel history from the segmentation module 1104.

EXAMPLES

The techniques described next are capable of taking a single video of a spin-stabilized projectile launch and calculating an estimate for the spin-rate (and velocity as described later). The only a-priori information required is the type of projectile being shot, and the number of stripes (which is usually 8, but can vary from 4 to 16). The time, date, and frame number from the video can all be determined automatically using optical character recognition [see Reference 12].

A logical first-approach to automating a manual process with a computer vision algorithm is to attempt to teach the computer to extract the same information from an image that the human eye is able to do. When an operator watches a launch video, the shape of the projectile is observed, and the striped area is monitored. Each time a stripe passes through the central axis, the time is noted. This same procedure can be completed automatically using image processing to find the projectile shape and determine the time when adjacent stripes rotate through the projectile axis.

Example 1: Hough Transform Analysis

Figure 13:
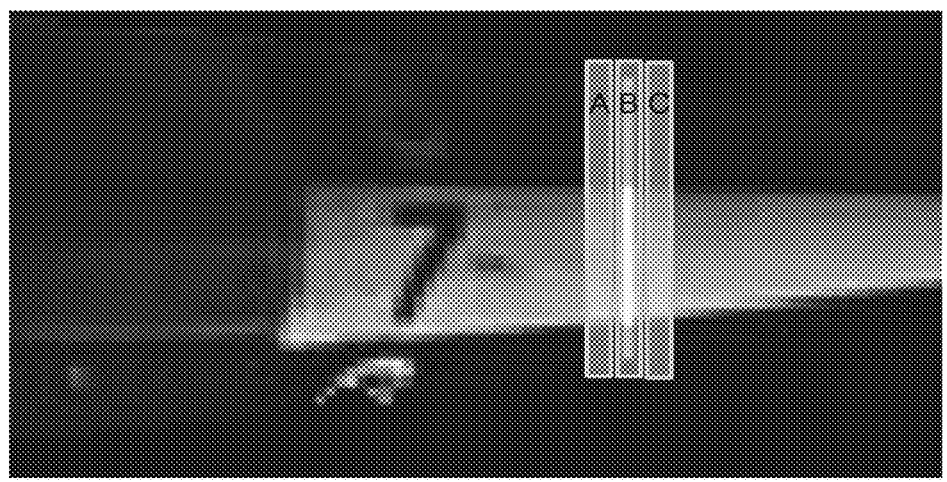
FIG. 13 illustrates a segmented, rotated, and scaled stripe region and highlighted stripe columns.

The procedure begins by importing a projectile launch video and running a segmentation algorithm as described in Reference 12 on each frame. The segmentation code conducts morphological operations on a grayscale version of each image frame, identifies which pixels correspond to the best fit of the projectile shape, and computes estimates for the nose and central moment locations of the projectile. FIG. 13 [see Reference 14] shows an image frame with a projectile properly segmented, classified, and certain keypoints identified. The software used to implement this algorithm was MATLAB version 7.12.0 [see Reference 13].

The next step in the spin-rate analysis is to compute the observed pitch angle ($\Phi_{obs}$) using Equation 2 (analogous of Equation 1) where the 'i' values correspond to the row number and the T values correspond to the column number of each pixel that was classified as representing the projectile $$\Phi_{obs} = \tan^{-1}\left(\frac{i_{nose} - i_{central\_moment}}{j_{nose} - j_{central\_moment}}\right). \qquad \text{Equation 2}$$

Each projectile pixel in the image is then rotated by $-\Phi_{obs}$ using Equation 3, so that the projectile axis now lays horizontally in the rotated image frame $$\begin{bmatrix} i \\ j \end{bmatrix}_{rot\Phi} = \begin{bmatrix} \cos(-\Phi_{obs}) & -\sin(-\Phi_{obs}) \\ \sin(-\Phi_{obs}) & \cos(-\Phi_{obs}) \end{bmatrix} \begin{bmatrix} i \\ j \end{bmatrix}_{orig}. \qquad \text{Equation 3}$$

For uniformity regardless of the size of the projectile in the image frame, the rotated image of the projectile is then resized based on the total length between the nose and base ($N_{pixels\_length}$) to remove the effects of scale (the projectile appears larger when it travels closer to the camera). For 155 mm projectiles, typical Trajectory Tracker videos show the projectile between 200 and 320 pixels in length. Therefore, the rotated projectile is scaled using Equation 4. Fractional scaling and fractional rotation of pixel values are handled using linear interpolation $$S_{scale} = \frac{320}{N_{pixels\_length}}. \qquad \text{Equation 4}$$

The next step is to extract a few columns of pixels through the striped region of the segmented, rotated, and scaled projectile image as shown in FIG. 13. Extracting more columns can increase robustness by generating an average vector that will be less sensitive to noise. A tradeoff exists for the number of stripe columns to extract, because the striped region of the projectile may be small and difficult to find in each frame. For the image in FIG. 13, three columns (A, B, and C) were selected as the three adjacent columns of pixels located 50% of the way from the projectile's central moment toward the projectile nose.

This process is repeated for each frame of the launch video. Frames where the shape of the projectile was not correctly matched to the projectile shape model [see Reference 12] are represented as stripe-column vectors of all zeros (dropout frames).

Once the entire video has been analyzed the next step is to determine the time it takes for each stripe boundary to rotate through the horizontal axis of the projectile. To do this, a graphical stripe-column history image is generated by taking the 55-pixel-tall average-stripe column vectors for each frame and displaying them side by side with the average-stripe-column of the next sequential video frame. The helical stripes in the resulting image resemble a barber's pole as displayed in the top of FIG. 14.

The algorithm proceeds to analyze the stripe-column history image by identifying each boundary location where a transition occurs between a black stripe and a white stripe. The approach found to work best for this analysis is the Canny edge detection method [see Reference 13]. Even with real video where the slight pixel contrast between the white and black stripes may not be easy to differentiate by an operator, the Canny method is able to identify candidate stripe boundaries. A slight problem with this approach is that the Canny method identifies regions between the projectile and the outlier data points as shown in the bottom image of FIG. 14. This is remedied by following the Canny edge detection with a step where all potential edge pixels are eliminated if the pixel location is above or below is an outlier pixel and additionally by using non-maxima suppression to reduce false-positive edge locations [see Reference 14].

Figure 14:
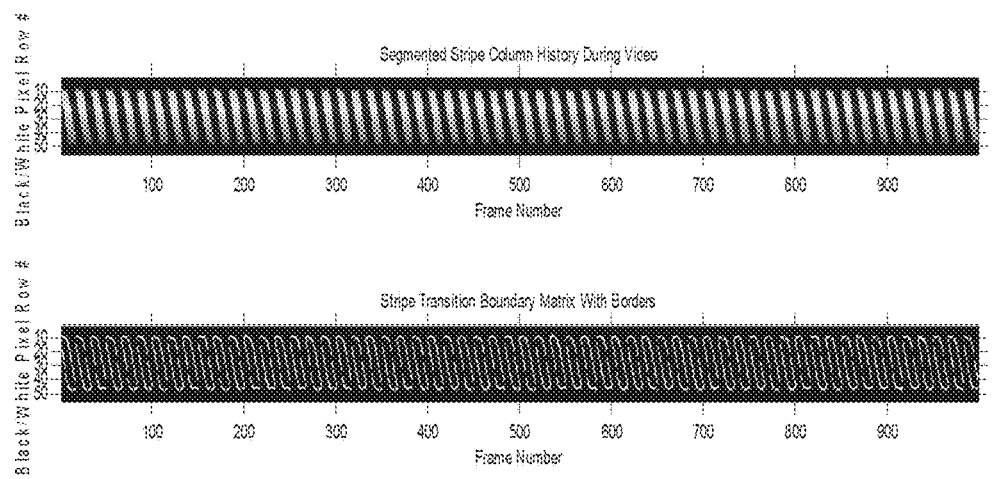
FIG. 14 illustrates a stripe-column history image to identify stripe boundaries.
Figure 15:
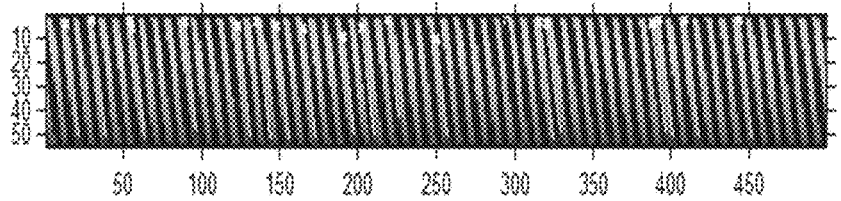
FIG. 15 illustrates initial Hough Transform candidate stripe boundaries.

The next step is to fit straight line segments to the boundary lines found in the edge detection algorithm. Estimates for the stripe-boundary lines are found using a two-stage Hough Transform algorithm [see Reference 15]. The initial Hough Transform analysis searches for lines with slope (theta) values ranging from −80° to −5° in the transition matrix, because as shown in FIG. 14, the horizontal lines along the top and bottom do not correspond to a true stripe transition. Experiment has shown that sizing the bins of the Hough Domain to a theta resolution of 0.5° and a rho resolution of 1 pixel, works well. The 20 bins that correspond to the 10 strongest Hough-lines are initially selected as shown in FIG. 15.

The median theta value from the first Hough Transform analysis is now used as a starting point for the second Hough Transform analysis. High-speed launch videos capture only a brief portion of flight, usually around a maximum of 0.2 sec for projectiles launched at low charges. Therefore, an assumption is made that the projectile spin deceleration is small and the slope of each one of the lines in FIG. 16 will be within five degrees of the median value from the initial Hough-Transform analysis. The second Hough Transform only searches for lines in this small window, but uses a finer theta resolution of 0.25°. For spinning projectiles, the 500 strongest lines will be used to generate several estimates of the true shape and location of each stripe boundary. This number was chosen because it allows the best-defined stripe boundaries to be represented by several line estimates, while preventing false-positive boundaries from being identified.

After finding several candidate Hough-lines for each stripe boundary, the next step is to find the average distance between adjacent stripes. Each Hough-line from the second Hough Transform analysis is examined to find the fractional frame number where it crosses the central axis of the projectile using Equation 5

$$x_{intercept} = \frac{\rho - y\sin(\theta)}{\cos(\theta)}.$$ Equation 5

Here 'ρ' and 'θ' are the parameters of the Hough-lines and 'y' is the number of the central row in the column of stripe pixels (y=28).

Figure 16:
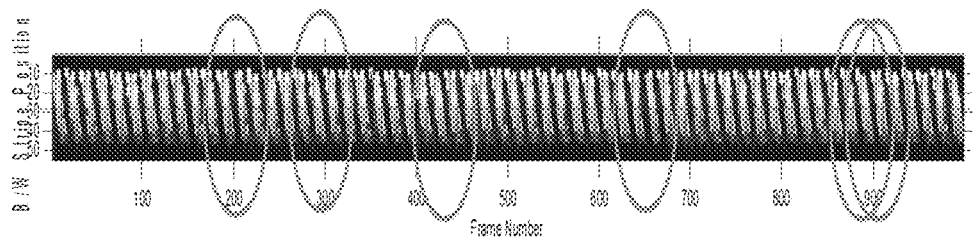
FIG. 16 illustrates stripe rotation crossings.

This results in up to 500 values corresponding to x-intercepts for the various line estimates found in the Hough Transform analysis. These values are then sorted and clustered using a nearest-neighbors algorithm. The best estimate for the x-intercept of each line is then taken as the mean value of each cluster. An example of the clustering of x-intercept values is shown in FIG. 16. Stripe boundaries that were not correctly identified (false negatives) are circled.

The final step in the algorithm is to convert the x-intercept cluster means ($\bar{x}_{cluster}$) from a fractional frame number to time in seconds. Equation 6 is used for the conversion from frame number to time $$t_{cluster} = \frac{\bar{x}_{cluster}}{Z_{FPS}}.$$ Equation 6

In Equation 6 $Z_{FPS}$ is the frame rate in frames per second, and was already determined using Optical Character Recognition by the segmentation code [see Reference 12].

The time between each cluster mean then represents the time elapsed between each stripe rotating through the center axis of the projectile. After computing the median time for the stripe rates, the values that correspond to false positive cluster means or false negatives (missed stripes) are eliminated if they vary from the median stripe rate by more than 10%. The average of the valid stripe rates is then taken. The projectile spin-rate is then the best-estimate of the stripe rate, divided by the total number of black and white stripes on the projectile.

Example 2: Discrete Fourier Transform Analysis

Figure 17:
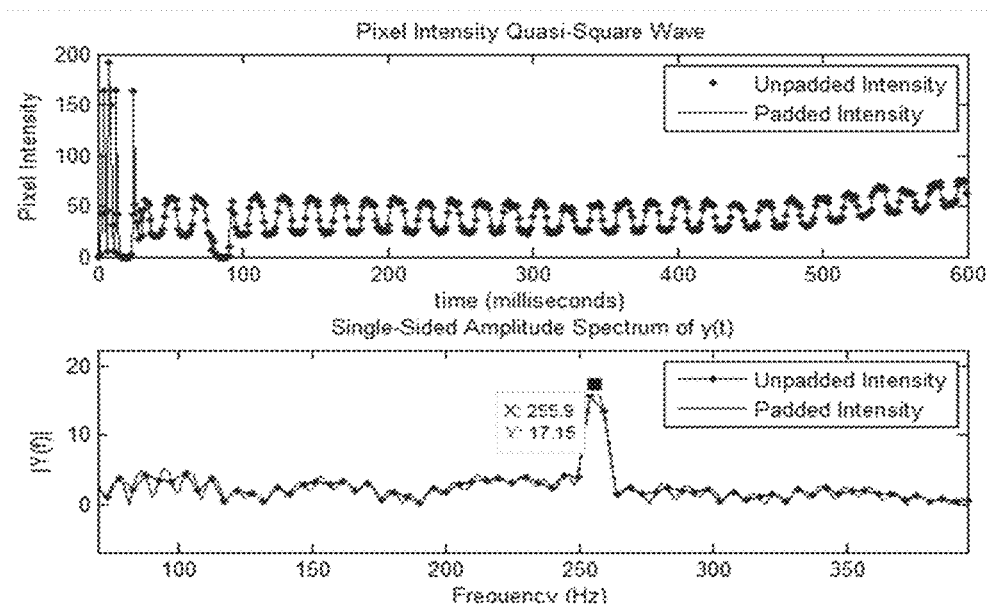
FIG. 17 illustrates axial row pixel intensity and frequency correlation results.

The pixel intensity values along the central row of the stripe-history image in FIG. 14 form a quasi-square wave, with low values during black stripes and high values during white stripes. This is illustrated in FIG. 17. Due to variations in lighting from day-to-day, or even from the beginning to the end of a launch video, it is not possible to simply threshold the stripe-column pixel intensity values to classify them as corresponding to a white or black stripe. Instead, a robust approach to solving this problem is to perform automated frequency-domain analysis on the stripe-column history image.

Using the Fast Fourier Transform (FFT) algorithm [see Reference 16], it is possible to quickly process the history of pixel intensities along the central row of the stripe-history image. The FFT analysis yields the plot shown in the bottom FIG. 7, which quantifies the correlation (y(t)) between the data stream and different oscillating frequencies found in the stripe-history image.

Initial efforts using the FFT algorithm yielded robust but relatively imprecise (resolutions only as small as ±1.7 Hz) measurements for the strongest frequencies detected in the span of 100-350 Hz (which correspond to spin-rates expected for a spin-stabilized artillery projectile). Padding the square wave with 10,000 zeros has the effect of linearly interpolating between adjacent data points, and improved the precision to within ±0.01 Hz in the desired span of frequencies.

Figure 18:
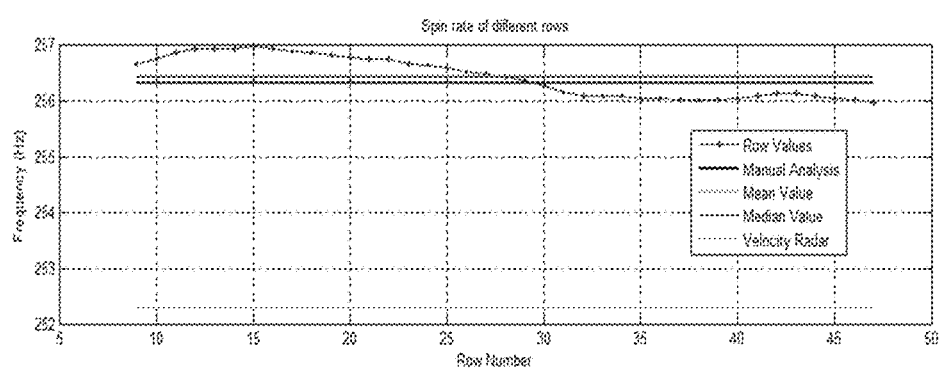
FIG. 18 illustrates a spin rate estimates from a Fast Fourier Transform analysis of the stripe history image.

A final improvement to the FFT analysis method involves using not only the central row of the stripe-history image, but instead incorporating the 20 rows above and below the central row as well. Although it helped to increase the frequency resolution, sequentially juxtaposing each row end-to-end to form a longer quasi-square wave resulted in creating artificial frequency peaks in the correlation results. Instead, the average peak-frequency detected in each row was averaged to give a best-overall estimate. This is illustrated in FIG. 18, which also identifies the mean and median values of the FFT analysis, the results of manual analysis on the same video, and a spin-rate estimate converted from a measurement for muzzle velocity radar.

Figure 19:
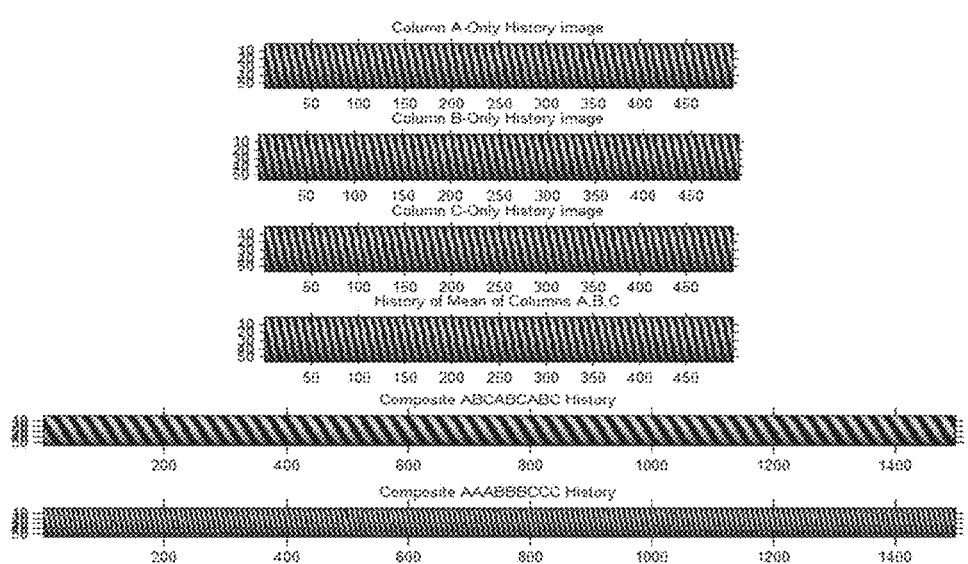
FIG. 19 illustrates different investigated stripe-column history configurations.

Other attempts to improve the precision of the analysis included generating composite stripe-history images from the A, B, and C columns from each video frame. Instead of simply creating a history image that was comprised the mean columns from the original A, B, and C columns, one was created that was three times longer and was comprised of a history image of all of the column A vectors, followed by one of all of the column B vectors, followed by all of the column C vectors as shown in FIG. 19. As discussed in the results section, this improved the accuracy of Hough Transform analysis method (Method 1), but introduced artificial frequency peaks in the FFT analysis estimate.

Example 3: Evaluation of Both Methods Using Synthetic Video and Real Video

Figure 20:
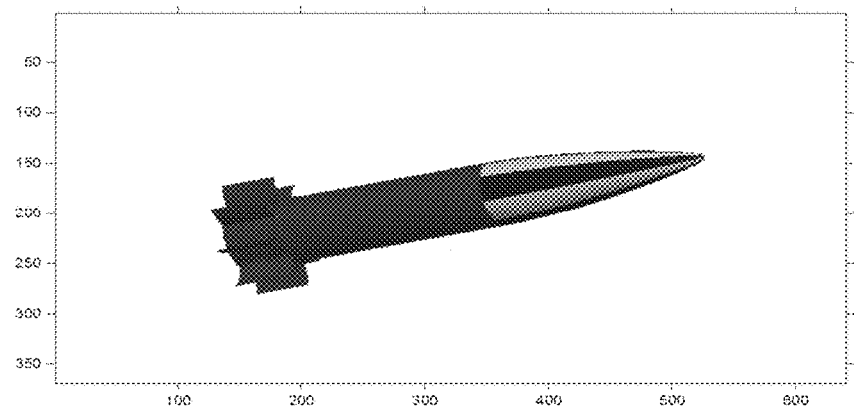
FIG. 20 illustrates a synthetic striped projectile video.

It is very difficult to acquire truth-data about the actual spin-rate of artillery projectiles. Therefore, to examine the accuracy of these algorithms, synthetic video is critical to ensuring that the most accurate results are achieved. To conservatively assess the ability of these algorithms to measure a known spin-rate, computer design software was used to generate a synthetic 10,000 frame per second video of an 8-striped projectile decelerating from a spin-rate of 300.8 Hz to 292.5 Hz in 0.1 seconds. Lighting configurations, projectile size, and the duration of the video were chosen to best replicate a real projectile launch video. In addition, the projectile pitch angle was allowed to oscillate from −10° to 10°. A frame from the synthetic video is shown in FIG. 20.

The video was analyzed over the first 0.09 seconds, during which the average spin-rate was 296.90 Hz. Using the Hough Transform analysis method (method 1), analysis of the mean layer predicted a spin-rate of 297.56 Hz, corresponding to an under-estimate of 0.224%. Analysis of the ABC/ABC composite image using Method 1 resulted in an estimate of 296.83 Hz, corresponding to an error of only −0.023%. The FFT analysis method (Method 2) provided an even-more accurate result, predicting the correct spin-rate to within 0.01% error for the mean-layer stripe history image.

When used on real video, the results for the FFT method proved to be much more consistent. A test was conducted in 2012 in which 5 instrumented 155 mm projectiles were painted with 4 stripes. On site were two cameras, positioned on opposite sides of the line-of-fire. Since a quadrant elevation of 800 mils (45°) was used, only about 0.06 seconds of quality flight video was captured by either camera. The resolution of these test were significantly lower than usual as well, because the cameras were positioned farther away from the line-of-fire to capture the longest amount of flight possible.

The last shot of this test was analyzed by two separate manual operators, whose results were within 0.2% of each other both cameras. Strangely, both users reported a higher spin rate for the right camera than the left camera, indicating that the time-keeping mechanism in the cameras may not be correctly matching up with the reported frame rate of 10,000 frames per second. This effect was also observed for each of the other shots of the test.

Due the combined effects of the decreased resolution, shortened time-of-flight captured, and factors such as noise and lens aberrations which are not accounted for in the synthetic video, Method 1 did not perform as well as expected. Method 2, however was within 0.13% of the manual method for all rounds tested. The results for each method are shown in Table 1. Running on an HP EliteBook laptop on a single 2.53 GHz processor, each video required less than 5 minutes to analyze.

TABLE 1

| Spin-Rate Results compared to Manual Data Analysis (Worst Result) | | | | | | | |
|---|---|---|---|---|---|---|---|
| | Left Camera | | | Right Camera | | | % Diff. |
| | User 1 | User 2 | Avg | User 1 | User 2 | Avg | Left vs. Right |
| Manual Analysis | 256.70 | 256.14 | 256.42 | 255.56 | 255.86 | 255.71 | 0.28% |
| | | Error Relative to Manual Avg | | | Error Relative to Manual Avg | | Left vs. Right |
| Mean Layer Analysis | 255.17 | 0.49% | | 258.55 | −1.11% | | −1.31% |
| Composite Layer Analysis | 215.33 | 16.02% | | 248.59 | 2.78% | | −13.38% |
| FFT: Single Row | 253.91 | 0.98% | | 258.79 | −1.21% | | −1.89% |
| FFT: Multiple Rows | 256.74 | −0.13% | | 255.38 | 0.13% | | 0.53% |
| Radar Spin Rate (from Muzzle Velocity Radar) | 252.19 | 1.65% | | — | 1.37% | | |

For each of the other tests, the results for Method 1 averaged an absolute error of less than 1% when compared to the manual data analysis. Method 2 calculated from multiple rows of the stripe-history image varied from the manual analysis by 0.02 to 0.22%. Interestingly, the spin-rates calculated from the reported muzzle velocity radar (direct correlation due to the 1-in-20 twist rate of a 155 mm cannon) was consistently 1.25-2.50% lower than the results from FFT and manual analyses. It is unlikely that the projectile spin-rate varies independently of the muzzle velocity, because these values are geometrically constrained by the rifling of the cannon tube. Therefore, this must either be the result of the muzzle velocity radar being incorrectly calibrated, or the timing mechanism reported by each the cameras may be corrupted by a similar delay. On-board accelerometer data was examined as well to give an indication of initial spin-rate, and found to be extremely coarse. Accelerometer estimates varied by as much as 37% for pairs of accelerometers located at different locations on the same projectile.

Although the results for Method 2 were consistently better than Method 1 for spin-stabilized projectiles, it has been observed that Method 1 has better resolution and accuracy for fin-stabilized projectiles, which leave the cannon muzzle with spin-rates typically lower than 20 Hz. Both approaches will be used in future research efforts to automatically quantify the spin-rate of slow-spinning fin-stabilized artillery projectiles.

Example 4: Sensitivity Study Using Synthetic Video

Since the FFT algorithm (method 1) showed to be more consistent for both real and synthetic video of spin-stabilized projectiles, it was used to evaluate the robustness of an automated analysis algorithm in terms of its sensitivity to frame rate, image resolution, and signal duration. In the absence of noise and lens aberrations, these effects are expected to be less severe for synthetic videos, but testing them at a known spin-rate allows the relationship between the method accuracy and the variable being tested to be evaluated.

The high spin-rate of spinning projectiles requires a fast camera frame rate to avoid aliasing of the stripes. Using the synthetic video described earlier, the video frames were sampled at different rates to simulate cameras functioning at different frame rates. It was found that at frame-rates higher than 5,000 frames per second, the analysis was very accurate. When played at 2,500 frames per second, it was difficult to smoothly observe the stripes rotating, but still the FFT analysis found the correct average spin-rate within 0.12%. Frame rates below 2,500 frames per second were insufficient to correctly identify the projectile spin-rate. The complete results are shown in Table 2.

TABLE 2

Automated Algorithm Sensitivity to Video Frame Rate

| Frames/sec | Calculated Rate (hz) | Actual Rate (hz) | % Error |
|---|---|---|---|
| 10000 | 296.93 | 296.90 | 0.010% |
| 5000 | 297.05 | 296.90 | 0.05% |
| 2500 | 297.25 | 296.90 | 0.12% |
| 2000 | 202.80 | 296.90 | −31.69% |
| 1000 | 47.17 | 296.90 | −84.11% |

As the distance between the camera and the projectile increases during flight, the average number of pixels along the projectile axis decreases. To investigate the effect of projectile image resolution, the synthetic video was resized to several different scales. In doing so, the method was found to be robust to image scales greater than 25%, which correspond to about 125 pixels along the length of the projectile. When the number of pixels along the length of the projectile drops below 39, the segmentation algorithm was unable to find and classify the shape of the projectile. The results are shown in Table 3.

TABLE 3

Automated Algorithm Sensitivity to Projectile Size (Image Resolution)

| Scale Ratio | Pixels Along Proj. Axis | Calculated Rate (hz) | Actual Rate (hz) | % Error |
|---|---|---|---|---|
| 100% | 423 | 296.93 | 296.90 | 0.009% |
| 75% | 316 | 296.93 | 296.90 | 0.010% |
| 50% | 210 | 296.92 | 296.90 | 0.007% |
| 40% | 168 | 296.90 | 296.90 | −0.001% |
| 30% | 125 | 296.94 | 296.90 | 0.015% |
| 25% | 104 | 297.65 | 296.90 | 0.253% |
| 20% | 82 | 235.13 | 296.90 | −20.81% |
| 15% | 64 | 262.08 | 296.90 | −11.73% |
| 10% | 39 | 236.47 | 296.90 | −20.35% |
| 5% | segmentation error | — | — | |

The final sensitivity study conducted on this algorithm involved the duration of the signal investigated. The period of the synthetic video tested for the other studies lasted 0.09 seconds. This represents the maximum amount of time that a launch video could capture a projectile traveling faster than 800 m/s. When launched at a higher elevation, the duration of the flight captured would be shorter, as was the case with the real videos collected where roughly 0.06 seconds of flight was captured. A longer video means more rotations are captured, increasing the number of data points.

TABLE 4

Algorithm Sensitivity to Video Duration (Number of Rotations Captured)

| # Frames | Video Duration (s) | # Revolutions | Calculated Rate (hz) | Actual Rate (hz) | % Error |
|---|---|---|---|---|---|
| 900 | 0.0900 | 26.72 | 296.93 | 296.90 | 0.011% |
| 500 | 0.0500 | 14.92 | 298.48 | 298.50 | −0.006% |
| 250 | 0.0250 | 7.49 | 299.55 | 299.50 | 0.017% |
| 200 | 0.0200 | 5.99 | 299.81 | 299.70 | 0.037% |
| 100 | 0.0100 | 3.00 | 300.81 | 300.10 | 0.237% |
| 50 | 0.0050 | 1.50 | 297.26 | 300.30 | −1.013% |
| 25 | 0.0025 | 0.75 | error | 300.40 | — |

Figure 21:
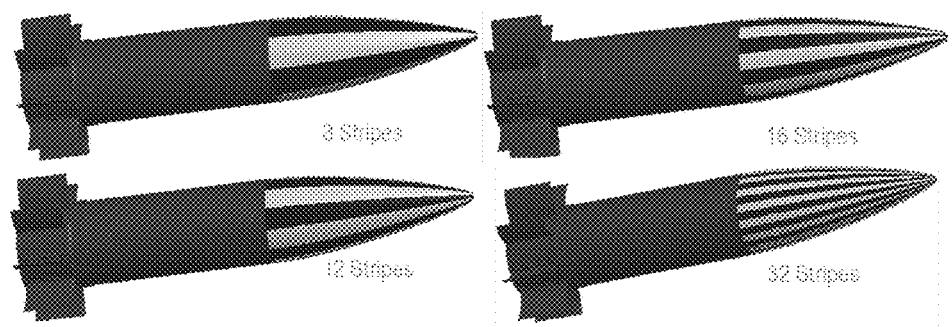
FIG. 21 illustrates different stripe numbers tested.

As shown in Table 4, the method is accurate for videos capturing more than 3 complete rotations. The error increases asymptotically when fewer stripes are observed. Therefore, a simple way to improve the accuracy of the spin-rate measurement is to paint more stripes on the projectile. As shown in FIG. 21, synthetic videos of 4, 8, 12, 16, and 32 stripe patterns were generated and tested using both methods. For projectiles with 4-16 stripes, the Hough Transform analysis method produced spin-rate estimates within 0.5% and the FFT analysis method was within 0.020%. When run with 32 stripes, neither method was able to estimate the spin-rate within 50%, indicating that a frame rate higher than 10,000 frames per second would be required for a bullet spinning at 300 Hz. When done by hand, it is difficult to paint a high number of stripes that are all the same width, so for spin-stabilized bullets it is sufficient to paint the projectiles with 4 stripes for a single spin-rate estimate, or 8 stripes if de-spin estimates are required as described next.

Example 5: Feasibility of Spin Damping Characterization

As indicated from the sensitivity studies, the FFT analysis method may be sufficiently accurate to measure the deceleration in spin-rate during a projectile launch video. To do this, spin-rate estimates are required for different portions of the projectile flight video. Using these measurements, the exponentially decaying spin rate can be characterized as $$p = p_0 \exp(-K_p s) \quad \text{Equation 7.}$$

In Equation 7 p is the spin-rate, $K_p$ is an exponential constant, and s is the non-dimensional distance-traveled $$s = \frac{V}{D_{proj}} t. \quad \text{Equation 8}$$

In Equation 8 $D_{proj}$ represents the projectile diameter, and V represents the velocity (assumed constant).

Relating the spin-rate to the non-dimensional distance traveled (s) is useful for the determination of the projectile's spin damping behavior because it allows calculation of the spin damping coefficient $$C_{lp} = \frac{2 m_{proj} k_x^2}{\rho_{air} S_{proj} D_{proj}} - K_p. \quad \text{Equation 9}$$

In Equation 9 m is the projectile mass, p is the density of air, S is the cross sectional area of the projectile, and $k_x$ is found from $$k_x^2 = \frac{I_x}{D_{proj}^2 m_{proj}}.$$ Equation 10

Values used for this analysis are shown in Table 5 for the M795 155 mm projectile, where $I_x$ and $I_y$ are the rotational inertia about the projectile's axis of symmetry and transverse axis (at the center of gravity).

TABLE 5

Values used for post processing

| | |
|---|---|
| Dia | 0.155 m |
| S | 0.0189 m^2 |
| mass | 46.72 kg |
| Ix | 1.73E−01 m^2 kg |
| Iy | 1.87E+00 m^2 kg |
| kx | 0.392 |
| ky | 1.291 |
| ρ | 1.2249 kg/m^3 |

From test data collected with light-sensing instruments, a similar 155 mm projectile initially spinning at 260 Hz decelerates due to drag to 240 Hz in 7 seconds [see Reference 16]. Assuming exponential decay for spin damping as shown in Equation 7, the spin-rate will decrease 0.267 Hz during a 0.09 second video. This correlates to a deceleration of only 0.103%, which is roughly one order of magnitude larger than the errors observed in the synthetic videos. Therefore, it may be possible in the future to use this automated method to quantify spin damping from launch video, but it would likely require cameras with better resolution and higher frame rates.

From the investigation of varying frame rate and varying image size, both have an impact on the accuracy of the spin-rate measurement. Often, high-speed cameras offer a tradeoff between increasing the frame rate versus degrading the image resolution. If this is the case, it appears that for measuring the spin-rate of artillery projectiles that using a higher frame rate is most important. As far as positioning the cameras for the best results, the automated spin-rate algorithm works best when the projectile is at least 125 pixels in length. This suggests that increased performance could be achieved by positioning the camera slightly farther from the line-of-fire than the 40 m standoff usually used for testing.

For spin-stabilized projectiles, 4 to 8 stripes are sufficient for this algorithm. Increasing the number of stripes may improve accuracy, but can come at a cost if the video frame rate is insufficient to distinguish different stripes.

A final recommendation is to paint the entire projectile, and remove any printed numbers on the stripes. At 10,000 frames per second, the patterns in the output image clearly distinguish between adjacent stripes, so for the purpose of automating the estimation process and achieving the best results, the numbers are unnecessary and can be detrimental to the analysis. If the entire projectile cannot be painted, then as much of the ogive region as possible should be painted because the paint in that region is least vulnerable to becoming blemished during cannon launch.

Future work will involve estimating the spin-rate of fin-stabilized artillery projectiles. This is an interesting challenge because there are far fewer data points, but knowledge of the initial spin-rate is important in characterizing the performance of the projectile's slip-driving obturator band to counter the effect of the cannon rifling. Mortars of all sizes could also be analyzed in this way. Preliminary results for the automated analysis of slow-spinning projectiles show that the Hough Transform analysis method yields results within 5% of manual analysis, and the FFT analysis has shown to be within 10%. For slow-spinning projectiles, there is a significant benefit to using more than 8 stripes, because in some cases less than one complete revolution is captured and few data points are available.

Figure 22:
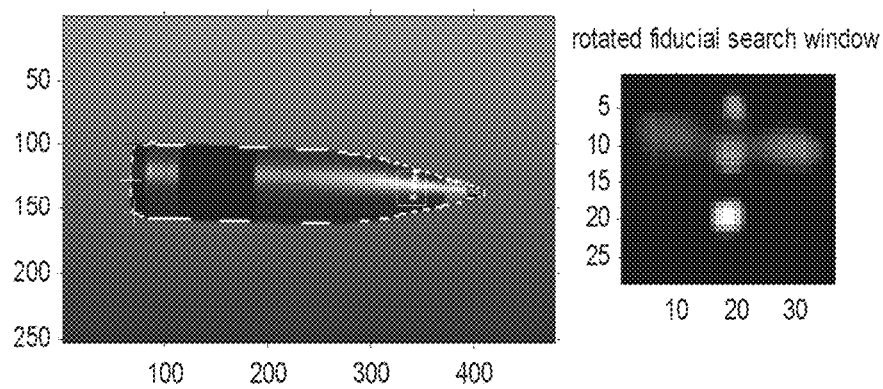
FIG. 22 illustrates detected weight zone markings on spinning projectiles.

Another area for future research involves using fiducial detection (other than stripes) to quantify projectile spin-rate. This may include detecting fiducials such as the white weight-zone markings already occurring on most artillery projectiles as shown in FIG. 22.

As the technology of range camera systems continues to improve, data extracted from artillery video will continue to grow in importance. The algorithms described in this paper are capable of analyzing launch video of artillery projectiles within minutes of being fired, and offering a quick and accurate estimate of projectile spin-rate for the critical first phase of projectile free-flight without the need for an operator in the loop. The Hough Transform analysis method is capable of measuring the spin-rate of synthetic video to within 0.5%, and the Fourier Transform analysis method is accurate to within 0.02%.

Both of these methods yield results close to those determined by manual analysis for real artillery launch video, but the FFT analysis method has shown to be the most accurate as well as the most reliable automated method for measuring projectile spin-rate. If these accuracies continue to be validated in future tests where more reliable estimates from other sources become available, the automated method may also give one of the most accurate means currently available to measure both spin-rate and muzzle velocity of artillery projectiles.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of determining a spin rate of a projectile, the method comprising:
receiving, with a receiving module, a video of a launch of a projectile, the projectile having at least one marking disposed thereon;
segmenting, with a segmenting module, a plurality of shapes of the projectile from the video, the segmenting module being configured to increase a sensitivity of the video to find the projectile in the video;
extracting, with an extraction module, at least one column of pixels of the at least one marking from the shapes;
generating, with a generating module, a stripe pixel column history image from the at least one column of pixels; and
calculating, with a calculating module, a spin rate of the projectile from the stripe pixel column history image.

2. The method of claim 1, wherein segmenting a plurality of shapes of the projectile from the video further comprises:
(i) selecting an image frame from the video;
(ii) locating a plurality of edges from the image frame;
(iii) dilating the plurality of edges;
(iv) connecting at least two of the plurality of the edges adjacent each other to define at least one shape;
(v) eroding a thickness of a boundary of the at least one shape;
(vi) removing the at least one shape from a border of the image, the border being defined by the plurality of edges;
(vii) selecting a shape from the at least one shape having a largest area of the at least one shape; and
(viii) determining when a size of the shape with the largest area is greater than or equal to a predefined sensitivity threshold,
wherein (i)-(viii) are repeated when the size of the shape with the largest area is less than the predefined sensitivity threshold.

3. The method of claim 2, wherein the sensitivity of the video is increased until the size of the shape with the largest area is greater than or equal to the predefined sensitivity threshold.

4. The method of claim 2, further comprising:
determining whether the selected image frame is a black and white image; and
converting the selected image to a black and white image when the selected image frame is not a black and white image.

5. The method of claim 2, further comprising:
analyzing an active shape model of the shape with the largest area when the size of the shape with the largest area is greater than or equal to the predefined sensitivity threshold;
determining when the shape with the largest area is the projectile from the video;
determining the number of iterations of (i)-(viii) have occurred when the shape with the largest area is determined not to be the projectile; and
increasing the sensitivity of the video when the number of iterations of (i)-(viii) is less than a predefined iteration threshold.

6. The method of claim 5, further comprising:
generating a stripe pixel column for the image frame when the shape with the largest area is determined to be the projectile in the video;
determining when the image frame is the last image frame in the video; and
at least one of:
repeating (i)-(viii) when the image frame is not the last image frame in the video; and extracting at least one column of pixels of the at least one marking from the shapes from the image frame.

7. The method of claim 5, further comprising:
ceasing segmenting a plurality of shapes of the projectile from the video when the number of iterations of (i)-(viii) is equal to the predefined iteration threshold.

8. The method of claim 1, wherein calculating a spin rate of the projectile from the stripe pixel column history image further comprises calculating the spin rate with at least one of:
a Fast Fourier transform; and
a Hough transform.

9. A computer program product comprising a non-transitory recording medium storing instruction for performing the method of claim 1, and a processor in communication with the memory that implements the instructions.

10. A system for determining a spin rate of a projectile, the system comprising:
a receiving module configured to receive a video of a launch of a projectile, the projectile having at least one marking disposed thereon;
a segmenting module configured to segment a plurality of shapes of the projectile from the video, the segmenting module including a sensitivity module configured to increase a sensitivity of the video to find the projectile in the video;
an extraction module configured to extract at least one column of pixels of the at least one marking from the shapes;
a generating module configured to generate a stripe pixel column history image from the at least one column of pixels; and
a calculating module configured to calculate a spin rate of the projectile from the stripe pixel column history image.

11. The system of claim 10, wherein the segmenting module is further configured to:
(i) select an image frame from the video;
(ii) locate a plurality of edges from the image frame;
(iii) dilate the plurality of edges;
(iv) connect at least two of the plurality of the edges adjacent each other to define at least one shape;
(v) erode a thickness of a boundary of the at least one shape;
(vi) remove the at least one shape from a border of the image, the border being defined by the plurality of edges;
(vii) select a shape from the at least one shape having a largest area of the at least one shape; and
(viii) determine when a size of the shape with the largest area is greater than or equal to a predefined sensitivity threshold,
wherein (i)-(viii) are repeated when the size of the shape with the largest area is less than the predefined sensitivity threshold.

12. The system of claim 11, wherein the segmenting module is further configured to increase a sensitivity of the video until the size of the shape with the largest area is greater than or equal to the predefined sensitivity threshold.

13. The system of claim 11, wherein the segmenting module is further configured to:
determine whether the selected image frame is a black and white image; and
convert the selected image to a black and white image when the selected image frame is not a black and white image.

14. The system of claim 11, wherein the segmenting module is further configured to:
analyze an active shape model of the shape with the largest area when the size of the shape with the largest area is greater than or equal to the predefined sensitivity threshold;
determine when the shape with the largest area is the projectile from the video;
determine the number of iterations of (i)-(viii) have occurred when the shape with the largest area is determined not to be the projectile; and
increase the sensitivity of the video when the number of iterations of (i)-(viii) is less than a predefined iteration threshold.

15. The system of claim 14, wherein the segmenting module is further configured to:
generate a stripe pixel column for the image frame when the shape with the largest area is determined to be the projectile in the video;
determine when the image frame is the last image frame in the video; and
at least one of:
repeat (i)-(viii) when the image frame is not the last image frame in the video; and
extract at least one column of pixels of the at least one marking from the shapes from the image frame.

16. The system of claim 14, wherein the segmenting module is further configured to:
cease segmenting a plurality of shapes of the projectile from the video when the number of iterations of (i)-(viii) is equal to the predefined iteration threshold.

17. The system of claim 10, wherein the calculating module is configured to calculate a spin rate of the projectile from the image with at least one of:
a Fast Fourier transform; and
a Hough transform.

18. A system for determining a spin rate of a projectile, the system comprising:
a receiving module configured to receive a video of a launch of a projectile, the projectile having at least one marking disposed thereon;
a segmenting module configured to segment a plurality of shapes of the projectile from the video, the segmenting module including a sensitivity module configured to increase a sensitivity of the video to find the projectile in the video is greater than or equal to a predefined sensitivity threshold;
an extraction module configured to extract at least one column of pixels of the at least one marking from the shapes;
a generating module configured to generate a stripe pixel column history image from the at least one column of pixels; and
a calculating module configured to calculate a spin rate of the projectile from the image with at least one of:
a Fast Fourier transform; and
a Hough transform.

19. The system of claim 18, wherein the segmenting module is further configured to:
select an image frame from the video;
determine whether the selected image frame is a black and white image;
convert the selected image to a black and white image when the selected image frame is not a black and white image;
locate a plurality of edges from the image frame;
dilate the plurality of edges;

connect at least two of the plurality of the edges adjacent each other to define at least one shape;
erode a thickness of a boundary of the at least one shape;
remove the at least one shape from a border of the image, the border being defined by the plurality of edges;
select a shape from the at least one shape having a largest area of the at least one shape;
determine when a size of the shape with the largest area is greater than or equal to a predefined sensitivity threshold;
analyze an active shape model of the shape with the largest area when the size of the shape with the largest area is greater than or equal to the predefined sensitivity threshold;
determine when the shape with the largest area is the projectile from the video;
determine the number of reprocessing iterations have occurred when the shape with the largest area is determined not to be the projectile;
increase the sensitivity of the video when the number of reprocessed iterations of is less than a predefined iteration threshold;
generate a stripe pixel column for the image frame when the shape with the largest area is determined to be the projectile in the video;
determine when the image frame is the last image frame in the video;
extract at least one column of pixels of the at least one marking from the shapes from the image frame; and
cease segmenting a plurality of shapes of the projectile from the video when the number of reprocessing iterations is equal to the predefined iteration threshold.

* * * * *